United States Patent
Wijnands et al.

(10) Patent No.: US 9,544,230 B2
(45) Date of Patent: *Jan. 10, 2017

(54) MIGRATION SUPPORT FOR BIT INDEXED EXPLICIT REPLICATION

(71) Applicant: CISCO TECHNOLOGY, INC., San Jose, CA (US)

(72) Inventors: Ijsbrand Wijnands, Leuven (BE); Gregory J. Shepherd, Eugene, OR (US); Christian Martin, Rumson, NJ (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 14/536,182

(22) Filed: Nov. 7, 2014

(65) Prior Publication Data

US 2015/0085635 A1    Mar. 26, 2015

Related U.S. Application Data

(63) Continuation-in-part of application No. 14/488,790, filed on Sep. 17, 2014, and a continuation-in-part of
(Continued)

(51) Int. Cl.
*H04L 12/18* (2006.01)
*H04L 12/741* (2013.01)
(Continued)

(52) U.S. Cl.
CPC ............ *H04L 45/745* (2013.01); *H04L 12/18* (2013.01); *H04L 45/16* (2013.01); *H04L 45/28* (2013.01);
(Continued)

(58) Field of Classification Search
None
See application file for complete search history.

(56) References Cited

U.S. PATENT DOCUMENTS

| | | | |
|---|---|---|---|
| 5,999,531 A | 12/1999 | Ferolito | 370/390 |
| 6,615,336 B1 | 9/2003 | Chen | 711/202 |

(Continued)

FOREIGN PATENT DOCUMENTS

| | | | |
|---|---|---|---|
| CN | 102025538 | 4/2011 | H04L 12/56 |
| WO | WO 2007/095331 | 8/2007 | 370/390 |

OTHER PUBLICATIONS

Eckert, Toerless et al., "Traffic Engineering for Bit Indexed Explicit Replication", U.S. Appl. No. 14/814,575, filed Jul. 31, 2015; consisting of Specification, Claims, and Abstract (75 pages); and Drawings (18 sheets).
(Continued)

*Primary Examiner* — Chirag Shah
*Assistant Examiner* — Amar Persaud
(74) *Attorney, Agent, or Firm* — Campbell Stephenson LLP

(57) ABSTRACT

A method and network device are disclosed for multicast forwarding. In one embodiment, the method includes receiving at a node configured to use a bit-indexed forwarding table a multicast message comprising an incoming message bit array. The method further includes comparing the incoming message bit array to a first neighbor bit array within a first forwarding table entry, and determining that for at least one relative bit position in the bit arrays a corresponding destination node is both a destination for the message and a reachable destination from a first neighboring node. The method further includes forwarding toward the first neighboring node a copy of the message, where a first node on the path of the forwarded message is not configured to use a respective bit-indexed forwarding table. An embodiment of
(Continued)

the device includes a network interface, a memory and a processor configured to perform steps of the method.

21 Claims, 14 Drawing Sheets

Related U.S. Application Data application No. 14/488,761, filed on Sep. 17, 2014, and a continuation-in-part of application No. 14/488,810, filed on Sep. 17, 2014.

(60) Provisional application No. 61/878,693, filed on Sep. 17, 2013, provisional application No. 61/931,473, filed on Jan. 24, 2014.

(51) Int. Cl.
    H04L 12/703      (2013.01)
    H04L 12/761      (2013.01)
    H04L 12/723      (2013.01)
(52) U.S. Cl.
    CPC .............. *H04L 45/54* (2013.01); *H04L 45/74* (2013.01); *H04L 45/50* (2013.01)

(56) References Cited

U.S. PATENT DOCUMENTS

| | | | |
|---|---|---|---|
| 6,771,673 B1 | 8/2004 | Baum | 370/535 |
| 7,925,778 B1 | 4/2011 | Wijnands | 709/238 |
| 8,320,374 B2 | 11/2012 | de Heer | 370/390 |
| 8,325,726 B2 | 12/2012 | Baban | 370/390 |
| 8,774,179 B1 | 7/2014 | Gaggara | 370/389 |
| 8,787,400 B1 | 7/2014 | Barth | 370/419 |
| 8,848,728 B1* | 9/2014 | Revah | H04L 47/125 370/386 |
| 8,942,256 B1 | 1/2015 | Barth | 370/469 |
| 2002/0126661 A1* | 9/2002 | Ngai | H04L 12/42 370/380 |
| 2002/0191628 A1 | 12/2002 | Liu | 370/428 |
| 2003/0210695 A1* | 11/2003 | Henrion | H04L 45/00 370/392 |
| 2007/0127474 A1 | 6/2007 | Mirtorabi et al. | 370/390 |
| 2007/0189291 A1 | 8/2007 | Tian | 370/390 |
| 2008/0159285 A1* | 7/2008 | de Heer | H04L 12/18 370/390 |
| 2009/0219817 A1 | 9/2009 | Carley | 370/235.1 |
| 2011/0228770 A1 | 9/2011 | Dholakia | 370/390 |
| 2011/0274112 A1* | 11/2011 | Czaszar | H04L 63/0227 370/392 |
| 2012/0099591 A1 | 4/2012 | Kotha | 370/392 |
| 2012/0243539 A1* | 9/2012 | Keesara | H04L 45/66 370/392 |
| 2013/0136117 A1* | 5/2013 | Schrum, Jr. | H04W 88/06 370/338 |
| 2013/0201988 A1 | 8/2013 | Zhou | 370/390 |
| 2013/0343384 A1* | 12/2013 | Shepherd | H04L 12/18 370/390 |
| 2014/0043964 A1 | 2/2014 | Gabriel | 370/229 |
| 2014/0119191 A1 | 5/2014 | Onoue | 370/236 |
| 2015/0049760 A1* | 2/2015 | Xu | H04L 45/16 370/390 |
| 2015/0078377 A1 | 3/2015 | Wijnands et al. | 370/390 |
| 2015/0078378 A1 | 3/2015 | Wijnands et al. | 370/390 |
| 2015/0078379 A1 | 3/2015 | Wijnands et al. | 370/390 |
| 2015/0078380 A1 | 3/2015 | Wijnands et al. | 370/390 |
| 2015/0131658 A1 | 5/2015 | Wijnands et al. | 370/390 |
| 2015/0131659 A1 | 5/2015 | Wijnands et al. | 370/390 |
| 2015/0131660 A1 | 5/2015 | Shepherd et al. | 370/390 |
| 2015/0138961 A1 | 5/2015 | Wijnands et al. | 370/228 |
| 2015/0139228 A1 | 5/2015 | Wijnands et al. | 370/390 |
| 2015/0181309 A1 | 6/2015 | Shepherd et al. | 725/109 |

OTHER PUBLICATIONS

Eckert, Toerless et al., "Traffic Engineering for Bit Indexrd Explicit Replication", U.S. Appl. No. 14/862,915, filed Sep. 23, 2015; consisting of Specification, Claims, and Abstract (75 pages); and Drawings (18 sheets).

Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Eckert, T., "Traffic Engineering for Bit Index Explicit Replication BIER-TE, draft-eckert-bier-te-arch-00," Network Working Group, Internet—Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet—Draft, Jul. 5, 2015, pp. 1-23.

Yonglianf Li, et al., Abstract Translation of CN-201010573400-A and CN 102025538, Database EPODOC [Online], European Patent Office, Apr. 20, 2011, pp. 1-2 [XP 002740355 on Extended EP SR].

Das, Kaushik, "IPv6 Header Deconstructed"; http://www.ipv6.com/articles/general/IPv6-Header.htm; Apr. 18, 2008; 2 pages.

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

Artel Video Systems, White Paper; "The Broadcaster's Guide to SMPTE 2022: Applications in Video Contribution and Distribution," Oct. 2014, pp. 1-7.

Bates, T. et al., "Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffscrv—The Scalable End-To-End Quality of Service Model," Aug. 2005, pp. 1-18.

Deering, S., Cisco Systems, Inc. and R. Hinden, Nokia, "Internet Protocol, Version 6 (IPv6)," Network Working Group, Request for Comments 2460, Dec. 1998, pp. 1-39.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc., "IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Tnc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00," Network Working Group, Internet—Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF" Network Working Group, Request for Comments 4915, Jun. 2007, pp. 1-20.

Psenak, P. et al., Cisco Systems: "OSPF Extensions for BIER, draft-psenak-ospf-bier-extensions-00," OSPF, Internet-Draft, Sep. 27, 2014, pp. 1-6.

(56) References Cited

OTHER PUBLICATIONS

Psenak, P. et al., Cisco Systems; "OSPF Extensions for BIER, draft-psenak-ospf-bier-extensions-01," OSPF, Internet-Draft, Oct. 24, 2014, pp. 1-8.

Rekhter, Ed. Y. et al., "A Border Gateway Protocol 4 (BGP-4)," Network Working Group, Request for Comments 4271, Jan. 2006, pp. 1-104.

Rosen, Ed. E. et al., "Multicast VPN Using Bier, draft-rosen-13vpn-mvpn-bier-01," Internet Engineering Task Force, Internet—Draft, Oct. 16, 2014, pp. 1-9.

Schulzrinne, H. et al.,; "RTP: A Transport Protocol for Real-Time Applications," Network Working Group, Request for Comments 3550, Jul. 2003, pp. 1-89.

SMPTE, "Beyond the Digital Conversion, The Integration of Information Technology and Professional Media, The Convergence of 2 Industrie—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.

SMPTE, "Transport of High Bit Rate Media Signals Over IP Networks (IIBRMT)," ST 2022-6:2012, © 2015 by the Society of Motion Picture and Television Engineers, Inc. (SMPTE), p. 1.

SMPTE, "Definition of Vertical Interval Switching Point for Synchronous Video Switching," RP 168:2009, © 2015 by the Society of Motion Picture and Television Engineers, Inc. (SMPTE), p. 1.

Whitcomb, Leigh, "Real-Time Professional Broadcast Signals Over IP Networks," Harris Corporation, Technology Conference, Apr. 2011, pp. 1-60.

Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.

Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.

Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.

Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.

Xu, X. et al., "BIER Encapsulation, draft-xu-bier-encapsulation-00," Network Working Group, Internet-Draft, Sep. 30, 2014, pp. 1-6.

Xu, X. et al., "BIER Encapsulation, draft-xu-bier-encapsulation-01," Network Working Group, Internet-Draft, Oct. 20, 2014, pp. 1-6.

\* cited by examiner

| Bit Indexed Routing Table A | | | 400 |
|---|---|---|---|
| RID | Set:BP | Label | Nbr |
| D/32 | 0:1 | 50 | B |
| F/32 | 0:2 | 70 | B |
| C/32 | -- | 40 | B |
| E/32 | 1:1 | 60 | B |
| B/32 | -- | 30 | B |

| Bit Indexed Routing Table B | | | 420 |
|---|---|---|---|
| RID | Set:BP | Label | Nbr |
| D/32 | 0:1 | 50 | C |
| F/32 | 0:2 | 70 | C |
| C/32 | -- | 40 | C |
| E/32 | 1:1 | 60 | E |
| A/32 | 0:3 | 20 | A |

| Bit-Indexed Forwarding Table A | | | | 540 |
|---|---|---|---|---|
| LL | BP | NBA | Nbr | RL |
| 20 | 1 | 0011 | B | 30 |
|  | 2 | 0011 | B | 30 |
| 21 | 1 | 0001 | B | 31 |
| 542 | 544 | 546 | 548 | 550 |

FIG. 5A

| Bit-Indexed Forwarding Table B | | | | 560 |
|---|---|---|---|---|
| LL | BP | NBA | Nbr | RL |
| 30 | 1 | 0011 | C | 40 |
|  | 2 | 0011 | C | 40 |
|  | 3 | 0100 | A | 20 |
| 31 | 1 | 0001 | E | 61 |
| 542 | 544 | 546 | 548 | 550 |

FIG. 5B

| Bit Indexed Routing Table A | | | 700 |
|---|---|---|---|
| RID | Set:BP | Label | Nbr |
| D/32 | 0:1 | 50 | B |
| F/32 | 0:2 | 70 | B |
| C/32 | -- | 40 | B |
| E/32 | 1:1 | 60 | B |
| B/32 | -- | -- | B |

702 → (points to B/32 row)

| Bit-Indexed Forwarding Table A | | | | 710 |
|---|---|---|---|---|
| LL | BP | NBA | Nbr | RL |
| 20 | 1 | 0011 | B | ? |
|  | 2 | 0011 | B | ? |
| 21 | 1 | 0001 | B | ? |

| BIER-only Routing Table A   1018 ||||
|---|---|---|---|
| RID | Set:BP | Label | Nbr |
| C/32 | -- | 40 | C |
| D/32 | 0:1 | 50 | C |
| E/32 | 1:1 | 60 | E |
| F/32 | 0:2 | 70 | C |

1020  1022  1024  1026

MIGRATION SUPPORT FOR BIT INDEXED EXPLICIT REPLICATION

RELATED APPLICATIONS

This application is a continuation-in-part of U.S. application Ser. No. 14/488,790, entitled "Bit Indexed Explicit Replication Using Multiprotocol Label Switching," filed Sep. 17, 2014, which in turn claims the domestic benefit under Title 35 of the United States Code §119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. This application is also a continuation-in-part of U.S. application Ser. No. 14/488,761, entitled "Bit Indexed Explicit Replication," which in turn claims the domestic benefit under Title 35 of the United States Code §119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. This application is also a continuation-in-part of U.S. application Ser. No. 14/488,810, entitled "Bit Indexed Explicit Replication Using Internet Protocol Version 6," filed Sep. 17, 2014, which in turn claims the domestic benefit under Title 35 of the United States Code §119(e) of U.S. Provisional Patent Application Nos. 61/878,693, entitled "Multicast IPv6 with Bit Mask Forwarding," filed Sep. 17, 2013, and 61/931,473, entitled "Bit Mask Forwarding Architectures for Stateless Multipoint Replication," filed Jan. 24, 2014. Each of the two provisional and three non-provisional applications referenced above is hereby incorporated by reference in its entirety and for all purposes as if completely and fully set forth herein.

BACKGROUND

Network nodes forward data. Network nodes may take form in one or more routers, one or more bridges, one or more switches, one or more servers, or any other suitable communications processing device. The data is commonly formatted as messages and forwarded using forwarding tables. A message is a formatted unit of data that typically contains control information and payload data. Control information may include information that identifies sources and destinations, such as addresses, error detection codes like checksums, sequencing information, etc. Control information is typically found in message headers and trailers. Payload data is typically located between the message headers and trailers. Depending on factors such as the network level and network protocol used, a message may be formatted and/or referred to as one of various specific types such as packets, datagrams, segments, or frames.

Forwarding messages involves various processes that, while simple in concept, can be complex. The processes involved in forwarding vary, depending on the type of forwarding method used. Overall forwarding configurations include unicast, broadcast, and multicast forwarding. Unicast is a method of point-to-point communication most often used when a particular node (known as a source) wishes to send data to another particular node (known as a receiver) and is not concerned with sending the data to multiple receivers. Broadcast is method used when a source wishes to send data to all receivers in a domain, and multicast allows a source to send data to a group of receivers in a domain while preventing the data from being sent to other receivers in the domain.

Multicast is the preferred method of data forwarding for many popular applications, such as streaming media distribution. One reason for this is that multicast is a bandwidth-conserving technology that allows delivery of data to multiple receivers while avoiding transmission of multiple copies of the same message over the same network link. However, in traditional multicast systems, a relatively large amount of control plane information is used. Setting up and maintaining this control information has a tendency to become complex and costly in terms of computing resources, and can become a major limiting factor in overall network performance.

BRIEF DESCRIPTION OF THE DRAWINGS

The present disclosure may be better understood, and its numerous objects, features, and advantages made apparent to those skilled in the art by referencing the accompanying drawings.

FIG. 4A is an exemplary routing table generated by a node of the network of FIG. 3.

FIG. 4B is an exemplary routing table generated by a node of the network of FIG. 3.

FIG. 5A is an exemplary forwarding table generated by a node of the network of FIG. 3.

FIG. 5B is an exemplary forwarding table generated by a node of the network of FIG. 3.

FIG. 7A is an exemplary routing table generated by a node of the network of FIG. 6.

FIG. 7B is an exemplary forwarding table generated by a node of the network of FIG. 6.

DETAILED DESCRIPTION

Overview

A method and network device are disclosed for multicast forwarding through bit indexed explicit replication (BIER). In one embodiment, the method includes receiving at a node in a network a multicast message comprising an incoming message bit array, where the node is configured to store and use a bit-indexed forwarding table comprising multiple forwarding table entries. Each of the multiple forwarding table entries comprises in this embodiment a respective neighbor bit array and is associated with a respective neighboring node, and a set of multiple possible destination nodes for the message corresponds to the same set of respective relative bit positions in the incoming message bit array and each of the neighbor bit arrays. In this embodiment, the method further includes comparing the incoming message bit array to a first neighbor bit array associated with a first forwarding table entry of the multiple forwarding table entries and determining that, for at least one relative bit position the corresponding destination node is both an intended destination for the message and a reachable destination from a first neighboring node associated with the first forwarding table entry. The method further includes forwarding toward the first neighboring node a copy of the message comprising a forwarded message bit array, where a first node on the path of the forwarded message is not configured to use a respective bit-indexed forwarding table.

Multicast

Multicast transmission delivers multicast data packets (data packets that traditionally include information identifying a multicast group, such as a multicast group address) from a source to multiple receivers without unduly burdening the source. Although much of the discussion in this disclosure is in terms of packets, it should be understood that the disclosures made herein may also be applicable to other types of network messages, such as datagrams or data frames. As used herein, the term "receiver" signifies a host (such as a computing device or application) that has subscribed to a multicast group. Instead of the source replicating a multicast data packet and sending a copy of the multicast data packet to each receiver, the source sends a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

Figure 1A:
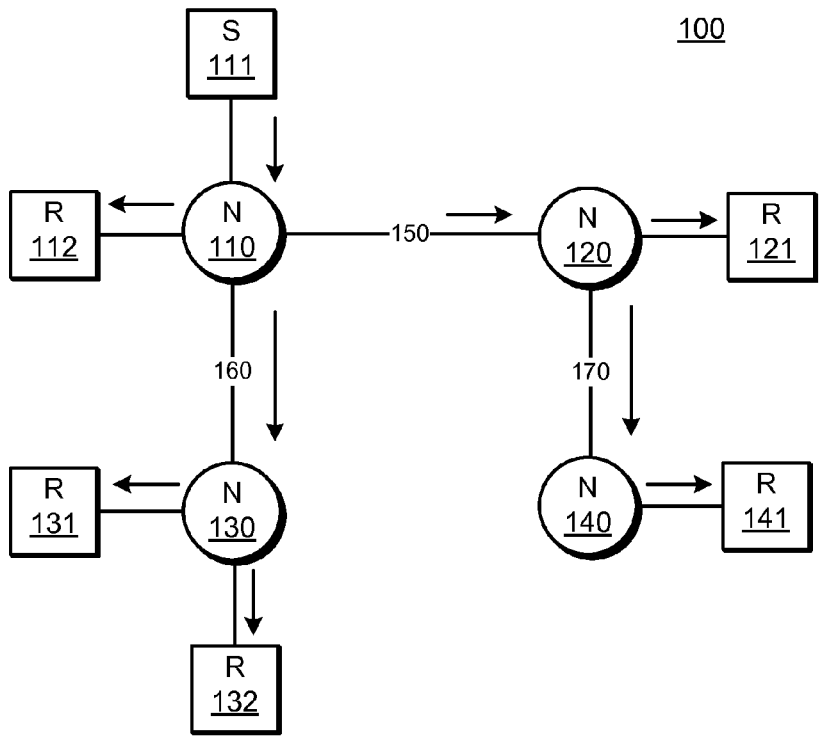
FIG. 1A is a simplified block diagram illustrating certain components of an example network.

FIG. 1A is a simplified block diagram of a network 100 performing multicast data transmission. Multicast-enabled nodes 110, 120, 130 and 140 are coupled through network links 150, 160, and 170. Multicast-enabled node 110 is also coupled to source 111 and receiver 112; multicast-enabled node 120 is coupled to receiver 121; multicast-enabled node 130 is coupled to receiver 131 and receiver 132; and multicast-enabled node 140 is coupled to receiver 141. Such coupling between the multicast-enabled nodes and the sources and/or receivers can be direct or indirect (e.g., via a L2 network device or another node).

For the purposes of this illustration, source 111 is a host configured to transmit multicast data packets to a multicast group that includes as receivers hosts 112, 121, 131, 132 and 141. Source 111 transmits a multicast flow, consisting of one or more multicast data packets having a common multicast group address, to multicast-enabled node 110 (illustrated by the arrow from 111 to 110). Multicast-enabled node 110 includes a multicast forwarding table that multicast-enabled node 110 uses to determine where to forward the multicast data packets associated with the multicast flow. The multicast forwarding table includes information identifying each interface of multicast-enabled node 110 that is connected via a path in the form of a multicast distribution tree (MDT) to one or more receivers for the multicast group (e.g., a host that has sent a join message, as described above). Multicast-enabled node 110 then replicates multicast data packets in the multicast flow and transmits the replicated multicast data packets from the identified interfaces to receiver 112, multicast-enabled node 120, and multicast-enabled node 130.

Multicast-enabled nodes 120 and 130 inform node 110 that they are coupled to one or more receivers using join messages such as, for example, a protocol independent multicast (PIM) join message. In response to receiving the join messages, multicast-enabled node 110 updates its multicast forwarding tables to identify interfaces to which multicast data packets should be forwarded. The multicast data packets can be replicated by node 110, and then nodes 130 and 120, as needed in order to provide the multicast data packets to receivers for the multicast group (e.g., receivers 131 and 132) and other multicast-enabled nodes on the MDT (e.g., multicast-enabled node 140). In this manner, a multicast flow from source 111 can be transmitted through a multicast network to multiple receivers.

Figure 1B:
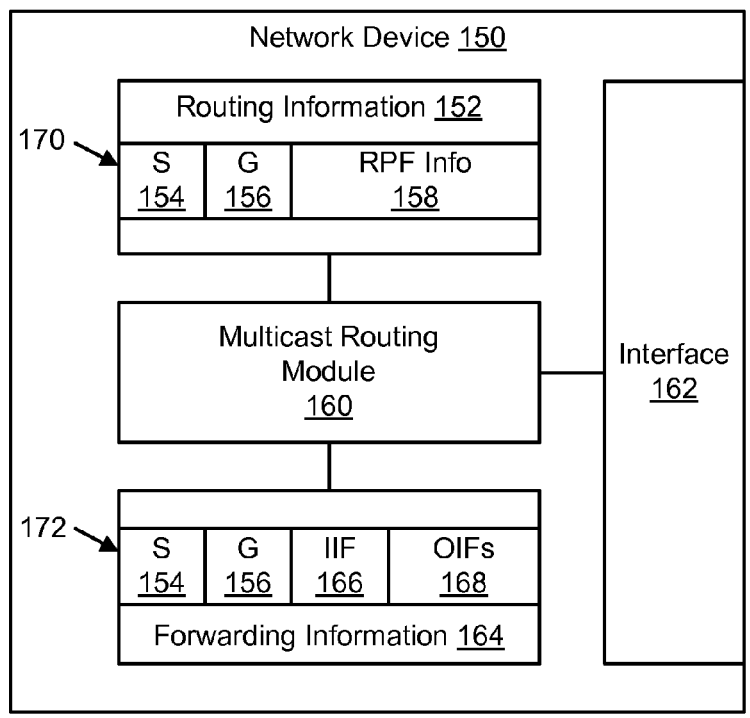
FIG. 1B is a simplified block diagram illustrating certain components of an exemplary network device that may be associated with one of the nodes of the network of FIG. 1A.

A block diagram of an exemplary network device that may be associated with a node in network 100 of FIG. 1A is shown in FIG. 1B. Network device 150 of FIG. 1B may, for example, be associated with multicast-enabled node 120 in FIG. 1A. In some cases "node" as used herein encompasses a network device associated with the node. "Network devices" as used herein includes various devices, such as routers, switches, or network controllers, that perform routing functions and support a routing protocol. A network device maintains one or more routing tables that stores routing information identifying routes to various data sources and/or data consumers. In a multicast-enabled node, a network device implements a multicast routing protocol that is used to convey multicast data packets from a multicast source such as source 111 of FIG. 1A to a multicast receiver. For each multicast group to which a multicast source sends data, the multicast routing protocol can establish a multicast distribution tree, which is a group of coupled nodes that can convey packets from the multicast source to the multicast receivers.

In the embodiment of FIG. 1B, network device 150 includes storage for multicast routing information 152, storage for multicast forwarding information 164, a routing module 160, and an interface 162. Interface 162 is coupled to send and receive packets. It is noted that network device 150 may include additional interfaces, and that each interface can be a logical or physical interface.

Routing module 160 is configured to perform multicast routing based on the stored multicast routing information 152. Routing module 160 is also configured to update the stored multicast forwarding information 164. A forwarding engine (not shown) can forward multicast data packets using the stored multicast forwarding information 164. Routing module 160 can implement one or more instances of a unicast routing protocol and one or more instances of a multicast routing protocol.

Entry 170 provides an example of the routing information that can be stored for a particular multicast group. As shown, entry 170 includes a source address (S) 154, a group address (G) 156, and reverse path forwarding (RPF) identifying information ("RPF info") 158. The RPF identifying information identifies which interface within a network device associated with node 110 properly receives multicast data packets addressed to group G, as well as the RPF neighbor that is properly forwarded those multicast data packets. The RPF interface is the interface leading to the root of the multicast tree for group G (e.g., the root of the multicast tree can be the rendezvous point associated with group G). The storage for multicast routing information 152 is, in one embodiment, implemented as a Multicast Routing Information Base (MRIB).

Entry 172 provides an example of the forwarding information that can be stored for a particular multicast group. As shown, entry 172 includes a source address (S) 154, a group address (G) 156, an incoming interface (IIF) list 166, and an outgoing interface (OIF) list 168. A forwarding engine uses the information in entry 172 to forward multicast data packets addressed to multicast group G. For example, when a packet having destination address G is received, the forwarding engine accesses entry 172 and verifies the source address and incoming interface of the packet. If the packet was received via an interface other than the one identified in IIF 166, the packet is dropped. If the packet matches the information in entry 172, the packet is forwarded from the interfaces listed in OIF 168. The storage for multicast forwarding information 164 is, in one embodiment, implemented as a Multicast Forwarding Information Base (MFIB).

The above-described process traditionally used in setting up MDTs and updating multicast forwarding tables for each multicast group results in considerable amounts of state information within the network. The multicast forwarding tables maintained by each multicast-enabled node, in particular, can become quite large in networks with many sources, many groups, or both. Maintaining such multicast forwarding tables represents limitations on network scalability.

Bit Indexed Explicit Replication

As described herein, the amount of state information within a multicast network may be reduced by methods, devices and systems in which receiver information is carried by the packet rather than being looked up in tables at each network node based on source and group information. In an embodiment, a group of receivers is represented by an array of bits carried in a packet, and the packet is forwarded based on this receiver information. This greatly reduces the amount of state information stored at nodes and is therefore also referred to as "stateless multicast." More formally, the term Bit Indexed Explicit Replication (BIER) is used to describe this approach. As suggested by the term, a bit position is used as an index into a forwarding table and packets are replicated only to specified nodes.

Figure 2A:
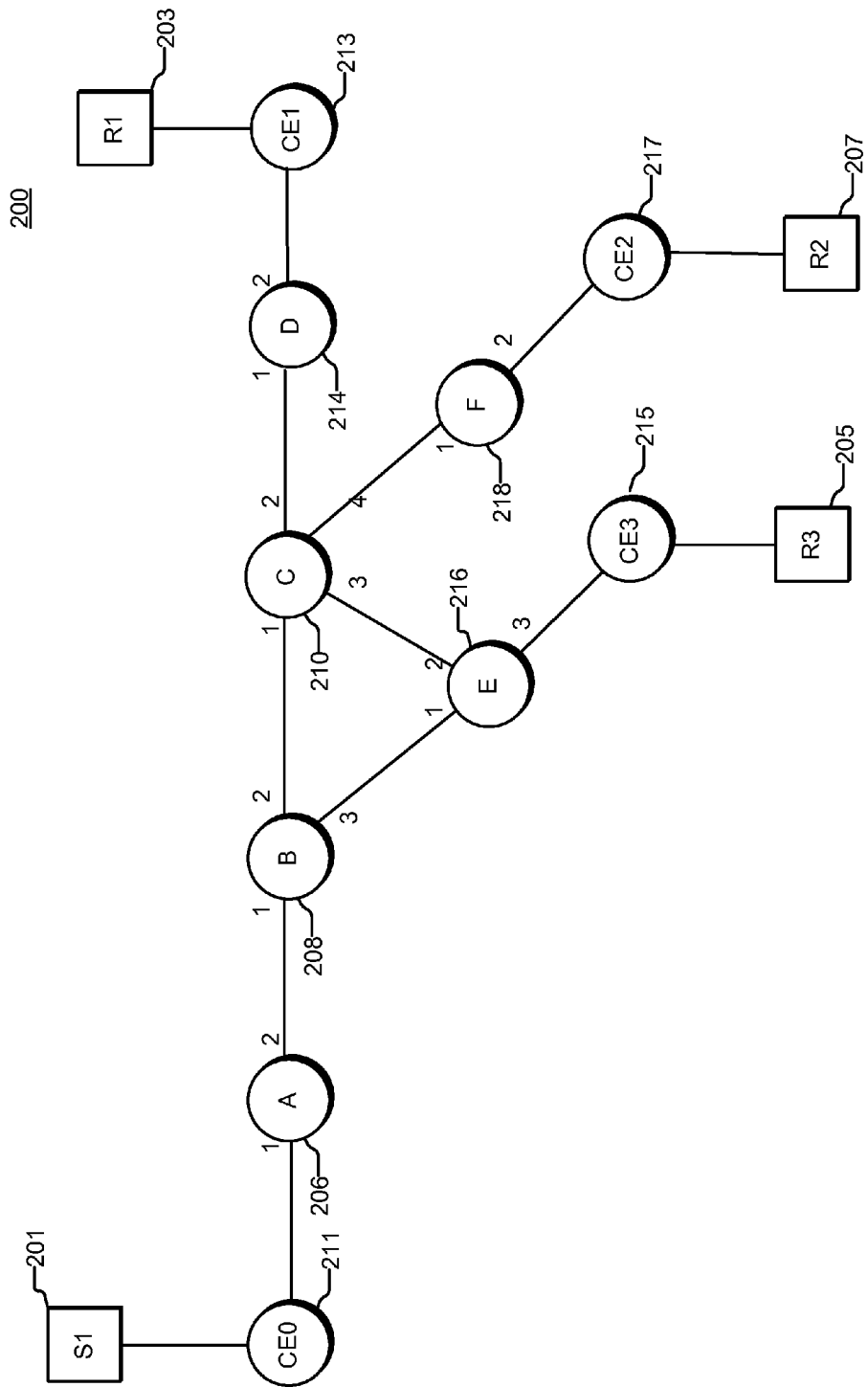
FIG. 2A is a simplified block diagram illustrating certain components of an example network.

FIG. 2 shows an example network 200. Network 200 includes BIER-enabled nodes 206-218. BIER-enabled nodes are configured to forward packets using BIER. For example, BIER-enabled nodes are configured to store and use bit-indexed forwarding tables, as explained further below. BIER-enabled nodes 206-218 form a provider network, or domain. Such a provider network could be employed by an Internet service provider to transport packets to customers. The domain includes core nodes 208 and 210, and provider edge nodes 206, 214, 216, and 218. The provider edge nodes are coupled to customer edge nodes 211, 213, 215, and 217. Hosts 201, 203, 205, and 207 are coupled to the customer edge nodes. In the embodiment of FIG. 2, host 201 is a multicast source, while hosts 203, 205 and 207 are configured as multicast receivers, or subscribers.

Each of the BIER-enabled nodes 206-218 has interfaces that are identified as shown. For example, BIER-enabled node 208 has three interfaces designated 1-3, respectively. Each BIER-enabled node is assigned a unique identifier or routable address known as a router identifier (RID). The RID can be implemented as, for example, an internet protocol (IP) address, prefix, or loopback address. Network 200 and the other BIER-enabled networks described herein are not limited to any particular version of IP, or to any particular routing protocol at all. Each BIER-enabled node advertises or floods the routable address to all other BIER-enabled nodes in network 200. Each BIER-enabled node builds a unicast topology of the BIER-enabled nodes in network 200 using the advertised routable addresses.

BIER-enabled node 206 is configured as an ingress router for multicast data packets. The ingress router is coupled, via customer edge node 211, to source 201. Multicast data packets from source 201 enter the BIER network via the ingress router (BIER-enabled node 206). Each of BIER-enabled nodes 214, 216, and 218 is configured as an egress router. The egress routers can be connected (directly or via customer edge routers) to hosts, such as receivers, or other networks. An egress router is a BIER-enabled node that is the last BIER-enabled node on a path between a source and a receiver. As such, an egress router is a destination node when forwarding using BIER. The egress router may be a provider edge node that is coupled to the receiver either directly or indirectly (e.g., through a non-BIER-enabled customer edge node).

In an embodiment, receiver information is included in the packet by assigning each egress router in a BIER network a bit position (BP) within a packet bit array carried by the packet (or, more generally, a message bit array carried by a network message). An egress router is also associated with the same relative bit position in a neighbor bit array stored in a bit-indexed forwarding table at a BIER-enabled node. Each of the packet bit array and neighbor bit array may also be referred to as a bit mask (BM) herein. In some embodiments, the packet bit array is referred to as a bit string or BitString and the neighbor bit array is referred to as a bit mask. As used herein, the term bit array, bit string or bit mask refers to a set of bits that has a fixed or variable length. The length of the bit arrays used in a particular BIER network can be statically configured or dynamically assigned and distributed through the BIER network. The bit array can have any suitable length. In an embodiment, the length is determined in view of the size and capabilities of the network. In one embodiment, the length of the bit array is between 8 and 4096 bits. In a further embodiment, the length of the bit array is between 256 and 1024 bits. The maximum bit array length value is determined, in one embodiment, by hardware or software limitations of the BIER-enabled nodes in the BIER network. In an embodiment, the number of egress routers represented by a bit array is increased by including a set identifier in the packet along with the bit array. The same bit position can then be used to represent one egress router in, for example, set 0, and a different egress router in set 1. In some embodiments, sets are used for network management purposes such as multi-topology routing, temporal slicing, or grouping of geographically-proximate nodes.

A bit position can be statically or dynamically assigned to an edge router. The bit position may be assigned by a central authority, such as a network controller, or through another mechanism such as derivation of a BP from an identifier for the router. Each edge router should have at least one unique bit position within the bit array. In an embodiment, multiple BPs are assigned to a single edge router, to allow multicast delivery, for example, to multiple receivers connected to the edge router via separate interfaces of the router. The edge router (or interface) associated with a bit position may vary with time in some embodiments, for purposes such as failure response or optimization of network performance.

BIER Packet Forwarding Example

Figure 2B:
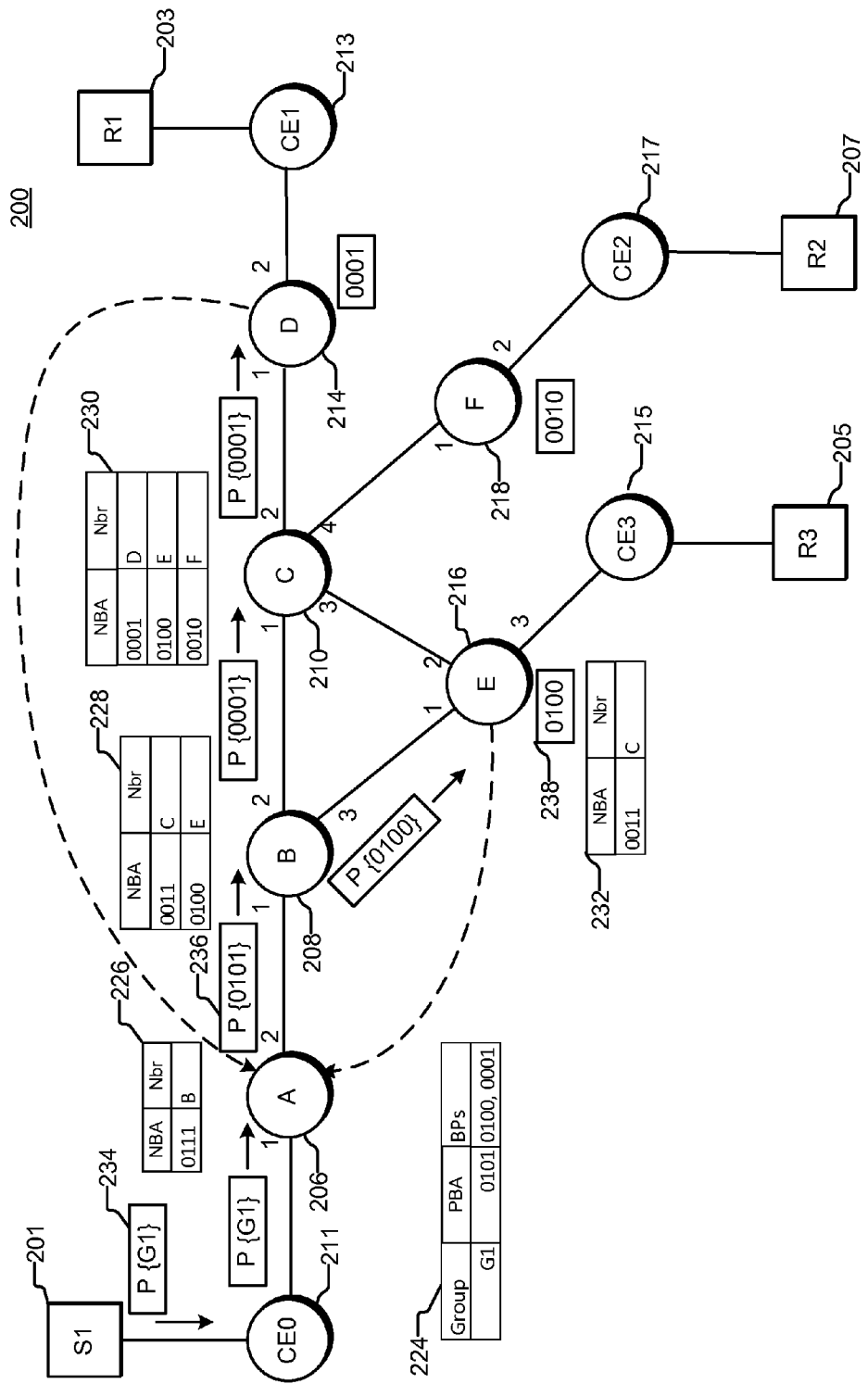
FIG. 2B is a simplified block diagram illustrating certain aspects of an exemplary forwarding process using the network of FIG. 2A.

To illustrate the operation of BIER packet forwarding, network 200 of FIG. 2A is shown again with additional annotation in FIG. 2B. In the embodiment of FIG. 2B, BIER-enabled node 214 (an egress router) signals to BIER-enabled node 206 (an ingress router) that BIER-enabled node 214 is interested in receiving packets associated with a given multicast group or flow. BIER-enabled node 216 likewise signals BIER-enabled node 206 that BIER-enabled node 216 is interested in the same multicast group. The signaling is represented by the dashed lines shown in FIG. 2. BIER-enabled node 206 updates an entry in group membership table (GMT) 224 (or creates one if one does not already exist) for the multicast group and updates a packet bit array (PBA) in the entry by setting bits corresponding to BIER-enabled nodes 214 and 216. Assuming that only BIER-enabled nodes 214 and 216 are interested in the flow, and not BIER-enabled node 218, the PBA is {0101}.

In the simplified example of FIG. 2B, the packet bit array and neighbor bit arrays used are four bits long, which is sufficient to represent the three egress routers in network 200, each connected to a respective one of the three receivers in the network. In this example, a "1" value in a bit position of a packet bit array indicates that the corresponding destination node is an intended destination for the packet. An alternative convention for the value at a bit position could be used in another embodiment, but in any case the value of the bit at a bit position in a packet bit array indicates whether the corresponding destination node is an intended destination.

BIER-enabled node (and ingress router) 206 is configured to receive a multicast data packet 234 addressed to the multicast group or flow (e.g., from source 201 via customer edge node 211). BIER-enabled node 206 uses the multicast group address and/or source address included in the multicast data packet to access its GMT and select a packet bit array associated with the multicast group. After selecting a PBA that corresponds to the multicast group from the GMT, BIER-enabled node 206 encapsulates the packet bit array into the multicast data packet, resulting in BIER packet 236. Ingress node 206 also identifies the neighbors to which packet 236 will be forwarded. In an embodiment, the neighbors are identified using the bit-indexed forwarding table (BIFT) of node 206, a portion 226 of which is shown in FIG. 2B. In a further embodiment, this involves performing an AND operation between the packet bit array and each neighbor bit array (NBA) in BIER-enabled node 206's BIFT. In this example, there is only one entry in the BIFT and the entry corresponds to BIER-enabled node 208. This means that the shortest path from BIER-enabled node 206 to all three of the egress routers in network 200 runs through BIER-enabled node 208. Since the result of the AND is TRUE for neighbor B (BIER-enabled node 208), BIER-enabled node 206 forwards the multicast data packet to BIER-enabled node 208. This forwarding may involve other information from the BIFT for node 206 not shown in portion 226, such as egress interface information. In the embodiment of FIG. 2B, BIER-enabled node 206 also modifies the packet bit array in the multicast data packet it forwards, as discussed further below.

In response to receiving the multicast data packet, BIER-enabled node 208 performs an AND between the packet bit array in the multicast data packet, {0101}, and the neighbor bit array in each entry in its BIFT (a portion 228 of which is shown). The result for neighbor C is TRUE so BIER-enabled node 208 forwards the multicast data packet to BIER-enabled node 210. BIER-enabled node 208 also modifies the packet bit array in the multicast data packet it forwards, as discussed below. The result for neighbor E is also TRUE, so BIER-enabled node 208 replicates the multicast data packet and forwards the multicast data packet to BIER-enabled node 216, which is an egress router. In the example of FIG. 2B, a "1" value in a bit position of a neighbor bit array indicates that the destination node assigned to the bit position is reachable from the neighboring node corresponding to the forwarding table entry containing the neighbor bit array. An alternative convention for the value at a bit position could be used in another embodiment, but in any case the value of the bit at a bit position in a neighbor bit array indicates whether the corresponding destination node is a reachable destination from the neighbor associated with the neighbor bit array.

BIER-enabled node 210, in response to receiving a copy of the multicast data packet, performs an AND between the packet bit array in the multicast data packet, {0001}, and the neighbor bit array in each entry in its BIFT (portion 230 of which is shown). The result for neighbor D is TRUE so BIER-enabled node 210 forwards the multicast data packet to BIER-enabled node 214 which is an egress router. The result for neighbor F is FALSE, so BIER-enabled node 210 refrains from forwarding the multicast data packet to BIER-enabled node 218. In this way the multicast data packet travels from the ingress router (BIER-enabled node 206) through the BIER network to the two egress routers that signaled an interest in the multicast group (BIER-enabled nodes 214 and 216).

In the embodiment of FIG. 2B, each time the BIER packet is forwarded using an entry in a bit-indexed forwarding table, the packet bit array in the forwarded packet is altered to clear any set bits in bit positions corresponding to nodes not reachable from the neighbor that the packet is being forwarded to. For example, when the multicast packet arrives at node B, it has an incoming packet bit array of {0101}. Comparison of the packet bit array to the neighbor bit arrays shown in BIFT portion 228 shows that the set first (rightmost) bit of the PBA corresponds to a destination node reachable through neighbor C, while the set third bit corresponds to a node reachable through neighbor E. The packet bit array in the packet forwarded to neighbor C accordingly has only the first bit set, and the PBA in the packet forwarded to neighbor E has only the third bit set. This modification of the packet bit array when a BIER packet is forwarded prevents looping and duplication by ensuring that a BIER-enabled node forwards a given multicast data packet only once based on a given bit position. This alteration of the packet bit array to clear bits that are not also set in the neighbor bit array is a form of masking by the neighbor bit array. In an alternative embodiment, the above-described modification of the packet bit array can be done as the packet arrives at the next node rather than as it leaves the forwarding node.

In addition to alteration of the packet bit array sent with a forwarded packet (which may also be called a forwarded packet bit array herein), the packet bit array used at a BIER-enabled node for comparison to each neighbor bit array within a BIFT may be modified each time a packet is sent. Specifically, if a packet is sent as a result of comparing the incoming PBA to a neighbor bit array in a bit-indexed forwarding table at the node, the PBA used for comparison to the next neighbor bit array in the forwarding table is altered to remove the destinations of the just-sent packet as intended destinations. Returning to the operation of node B in FIG. 2B, in one embodiment the incoming PBA of {0101} is compared to NBA {0011} for neighbor C. Because bit position 1 is set in both of these arrays, a packet is sent to neighbor C with the PBA modified in the sent packet as described above. In addition, the incoming PBA may be altered so that position 1 is no longer set before moving down the table to compare to NBA {0100} for neighbor E. The PBA used to compare to the forwarding table entry for neighbor E is therefore {0100} in such an embodiment. Because position 1 is not set in the NBA for neighbor E anyway, alteration of the PBA before comparison does not have an effect in this case. This alteration can prevent sending of a duplicate packet, however, in a case for which multiple forwarding table entries have an NBA with the same bit set. This can happen, for example, in equal cost multi-path (ECMP) arrangements.

The above-described modifications to the packet bit array are not needed in embodiments in which the network has a loop-free topology. One example of a loop-free topology is a point-to-multipoint (P2MP) label switched path (LSP) in a network employing multiprotocol label switching (MPLS). Modifications to the packet bit array may also be omitted in embodiments in which some amount of looping and/or duplication can be tolerated.

Bit-Indexed Routing and Forwarding Tables

Each BIER-enabled node in the BIER network uses the BPs and router identifiers (RIDs) of the other BIER-enabled nodes to generate one or more bit-indexed routing tables (BIRTs) and bit-indexed forwarding tables (BIFTs). A bit-indexed routing table is a table that stores BP-to-router identifier mappings. In an embodiment, the BIER-enabled nodes learn about the BP-to-router ID mappings through advertisements sent by the BIER-enabled nodes having assigned bit positions.

In response to a BP being assigned to an egress router, the egress router advertises its BP along with its router identifier to some or all of the other nodes in the BIER network. In one embodiment, the ER advertises its BP via an interior gateway protocol (IGP). Within an autonomous system, an IGP is used for exchanging network topology information between nodes (all nodes, whether BIER-enabled or not). An autonomous system, or routing domain, as used herein refers to a collection of interconnected network nodes under a common administration for purposes of network configuration. There are different types of IGPs, which vary in terms of, for example, the particular information exchanged between nodes, whether information is shared only with neighbor nodes or "flooded" throughout the autonomous system, and how often the exchanged information is updated. In one type of IGP called a link-state routing protocol, every router constructs a topological map of network connectivity in the form of a graph, showing which routers are connected to which other routers. Each router can use its map to independently calculate the best logical path from it to every possible destination in the network. The collection of best paths will then form the routing table. Examples of link-state routing protocols include the intermediate system to intermediate system (IS-IS) and the Open Shortest Path First (OSPF) protocols. Messages called advertisements are used in IGPs to exchange information. Nodes in an IP network automatically exchange network topology information through IGP advertisements.

In an embodiment, ISIS and/or OSPF protocols can be modified to assist in distributing BP-to-router ID mappings through the BIER network using link state updates. In OSPF, such a link state update is called a link-state advertisement (LSA). Certain types of LSAs are "opaque" LSAs which are forwarded through the network even by nodes that do not themselves have the capability to use the information in the LSA. Such opaque LSAs may be useful in networks having both BIER-enabled and non-BIER enabled nodes, as noted below in the discussion of migration to BIER-enabled networks. Other flooding mechanisms to distribute the information are possible. All BIER-enabled nodes in a BIER network, not just the egress routers, also flood their respective router identifiers, which are used in building network topology and unicast forwarding tables. BIER-enabled nodes, in one embodiment, advertise additional information as well, such as a bit mask size that the BIER-enabled node is configured to use. Adding such BIER information to the advertised information is a relatively small amount of additional information, as compared with the usual topology information exchanged through IGP advertisements, and the state information maintained on a per-group basis in traditional multicast.

Using a mechanism such as IGP advertisements, each BIER-enabled node receives BP-to-router identifier mappings and stores them in a BIRT. In an embodiment using an MPLS implementation of BIER, the BIER-enabled node also includes at least one label range in the BIRT for each router ID. If multiple bit array sizes are in use, BIER-enabled nodes advertise multiple label ranges, for example, one label range for each bit array size.

Using the router identifiers, a BIER-enabled node performs a recursive lookup in unicast routing tables to identify a directly connected next hop BIER-enabled node (referred to herein as a neighbor (Nbr)) on the shortest path from the BIER-enabled node toward the BIER-enabled node associated with the BP, and the interface via which the neighbor is reachable. In one embodiment, the neighbor is the next hop on a shortest path (SPT) towards the egress router that originated the advertisement of the bit position. In one embodiment, the BIRT includes one entry per BP. In an MPLS implementation, each entry can include multiple label ranges associated with the router ID; for example, if the BIER-enabled node uses multiple bit array sizes, each bit array size has an associated label range.

Figure 3:
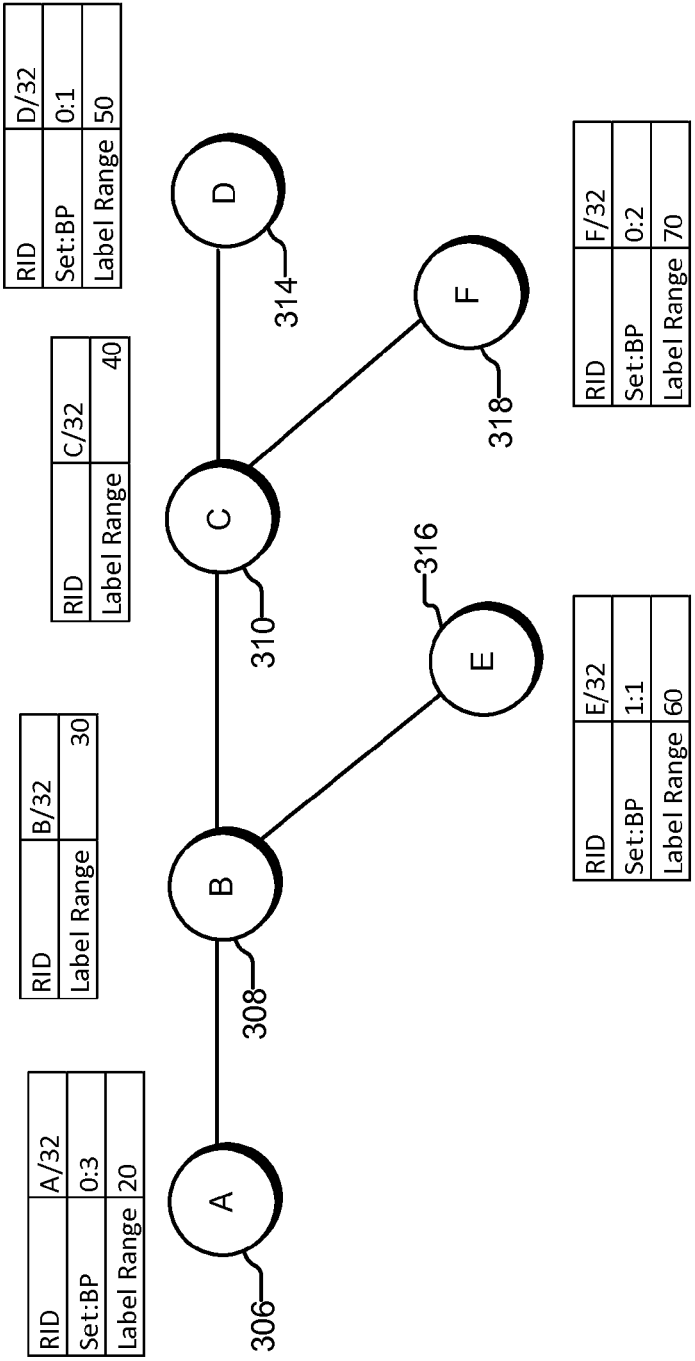
FIG. 3 is a simplified block diagram illustrating certain components of an example network.

Example BIRTs and BIFTs are described in the context of FIG. 3. FIG. 3 is similar to FIG. 2A, in that FIG. 3 depicts an example network 300. Network 300 includes BIER-enabled nodes 306-318. BIER-enabled nodes 306-318 form a provider network, or domain. Such a provider network could be employed by an Internet service provider to transport packets to customers. The domain includes core nodes 308 and 310, and provider edge nodes 306, 314, 316, and 318. Each BIER-enabled node is assigned and advertises the router ID (RID) shown. In the case of ingress router 306 and egress routers 314, 316, and 318, the set identifier and bit position shown are also assigned and advertised. In the embodiment of FIG. 3, network 300 implements MPLS, so that each BIER-enabled node also allocates and advertises the label range initial value shown.

BIER-enabled node 316 is shown as being assigned a BP in set 1, while BIER-enabled nodes 306, 314, and 318 are in set 0. In an embodiment, each BIER-enabled node has allocated a label range such that each set has its own label. If BIER-enabled node 306 forwards a multicast data packet having one or more bits set at respective BPs corresponding to egress routers in set 0, BIER-enabled node 306 uses label 20. If BIER-enabled node 306 forwards a multicast data packet having one or more bits set for BPs corresponding to egress routers in set 1, BIER-enabled node 306 uses label 21. In this example there are two sets (0 and 1). If there were a third set—e.g., an ER had been assigned a BP in set 2—BIER-enabled node 306 would use label 22 for BPs corresponding to egress routers in set 2. In one embodiment, each BIER-enabled node allocates a contiguous range of labels, e.g., 256 labels, to accommodate a set length used by some or all of the BIER-enabled nodes in the network. In the example of FIG. 3, we assume the bit array length is the same on all BIER-enabled nodes.

Using the example MPLS-implemented BIER network of FIG. 3, FIGS. 4A and 4B show exemplary BIRTs constructed by BIER-enabled nodes 306 and 308, respectively. As shown in FIG. 4A, BIER-enabled node 306 constructs a bit-indexed routing table 400. Bit-indexed routing table 400 includes a column 402 for router ID received in advertisements from other network nodes. The router ID, in one embodiment, is a prefix assigned to each node. BIRT 400 also includes a column 404 for information identifying the set and bit position associated with the BIER-enabled egress nodes identified in the router ID column. In an embodiment, interior nodes that are neither ingress nor egress nodes, such as the nodes labeled B and C, are not assigned bit positions. Nodes B and C therefore have null entries in column 404. At 406, bit-indexed routing table 400 includes a column for information identifying a label range associated with (e.g., advertised by) each of the BIER-enabled nodes identified in the router ID column. In the embodiment of FIG. 4A, the initial label in the range is provided.

Bit-indexed routing table 400 also includes, at 408, a column for the neighbor used for routing to each node in the table. The neighbor column identifies the BIER-enabled router that is next on a path between node 306 and the node identified in the RID column of the bit-indexed routing table. For example, as shown in FIG. 3, the next hop BIER-enabled node between BIER-enabled node 306 (A/32) and BIER-enabled node 314 (D/32), is BIER-enabled node 308 (B/32). Bit-indexed routing table 400 may also include other information not shown in FIG. 4A, such as egress interface information and other information that might also appear in a traditional routing table.

FIG. 4B shows a bit-indexed routing table for BIER-enabled node 308. Bit-indexed routing table 420 is similar to BIRT 400, and accordingly includes router ID column 402, set:bit position column 404, label range column 406 and neighbor column 408 as described for table 400 above. The values within these columns are different from those in the corresponding columns of table 400, since table 420 is for use by node 308 (labeled "B" in FIG. 3) rather than node 306 (labeled "A" in FIG. 3).

Each BIER-enabled node translates its BIRT(s) into one or more bit-indexed forwarding tables (BIFTs). FIG. 5A shows an exemplary bit-indexed forwarding table 540. In one embodiment, BIFT 540 is created by BIER-enabled node 306 of FIG. 3. BIFT 540 includes column 542, which includes information identifying local, or incoming, MPLS labels used by the BIER-enabled node that created the BIFT (BIER-enabled node 306 in the example of FIG. 5A.) The local label column 542 includes a local label for each set in which bit positions have been assigned. In the case of FIG. 5A, set 0 (which corresponds to local label 20) and set 1 (which corresponds to local label 21) are in use by BIER-enabled node 306. Table 540 also includes a bit position column 544. For each local label, each bit position that has been assigned to an egress router reachable from the node using table 540 has an entry in the embodiment of FIG. 5A. Column 546 includes information identifying a neighbor bit array (NBA) which can be compared to a packet bit array within a multicast data packet arriving at BIER-enabled node 306. To the extent that any reachable nodes indicated by the neighbor bit array are also intended destination nodes for the arriving multicast packet (indicated in this example by set bits in the packet bit array), a forwarded packet bit array matching the neighbor bit array is sent with the forwarded multicast data packets toward the egress routers corresponding to the bits indicated in the neighbor bit array. At 548, information identifying the neighbor along the shortest path towards the egress router corresponding to the BP identified in column 544 is included.

BIFT 540 also includes a remote, or outgoing, label column 550. The BIER-enabled node that maintains the forwarding table, in this case, BIER-enabled node 306, inserts the label identified in column 550 into a multicast data packet's header and then forwards the multicast data packet along the shortest path towards the neighbor identified in the corresponding BIFT entry. Bit-indexed forwarding table 540 may also include other information not shown in FIG. 5A, such as egress interface information and other information that might also appear in a traditional forwarding table.

Similar to bit-indexed forwarding table 540 of FIG. 5A, bit-indexed forwarding table 560 of FIG. 5B includes information used by a BIER-enabled node to forward multicast data packets. In one embodiment, BIFT 560 is created by BIER-enabled node 308 of FIG. 4. Bit-indexed forwarding table 560 includes local label column 542, bit position column 544, neighbor bit array column 546, neighbor column 548, and remote label column 550, as described above for BIFT 540. The values within these columns are different from those of table 540, however, since table 560 is configured for forwarding from a different node.

In the example of FIGS. 4B and 5B, in response to receiving a multicast data packet with local label 30 (corresponding to set 0), a BIER-enabled node determines how to forward the packet. Since egress routers corresponding to bit position 1 (SI:BP equal to 0:1) and bit position 2 (SI:BP equal to 0:2) are shown in routing table 420 of FIG. 4B to be reachable via C, the corresponding BPs are aggregated to form neighbor bit array 0011 in forwarding table 560, which the BIER-enabled node puts in the BIFT entries corresponding to neighbor C. The aggregation involves, in one embodiment, performing a logical OR operation between bit arrays that each have a bit set only in the BP corresponding to the respective egress router reachable from the neighbor. The egress router corresponding to bit position 3 (SI:BP equal to 0:3) is shown in routing table 420 to be reachable via A. The corresponding bit is set in the neighbor bit array for neighbor A in BIFT 560. For set 1 (label 31), the ER corresponding to bit position 1 (SI:BP equal to 1:1) is shown in routing table 420 to be reachable via E.

Migration to a BIER-Enabled Network

The above discussion of BIER network operation is generally in the context of networks in which all nodes between (and including) the ingress node and egress node are BIER-enabled (e.g., able to access packet bit arrays and to create and use bit-indexed forwarding and routing tables). Because practical networks are often expanded, upgraded and otherwise reconfigured over time, however, capabilities of the nodes and their associated network devices can be inhomogeneous across a network. An upgrade requiring only a software download and install at one node may require replacement of line cards or other hardware at another node. A practical network configured to use BIER for multicast transmission may nonetheless include some nodes that are not BIER-enabled.

Figure 6:
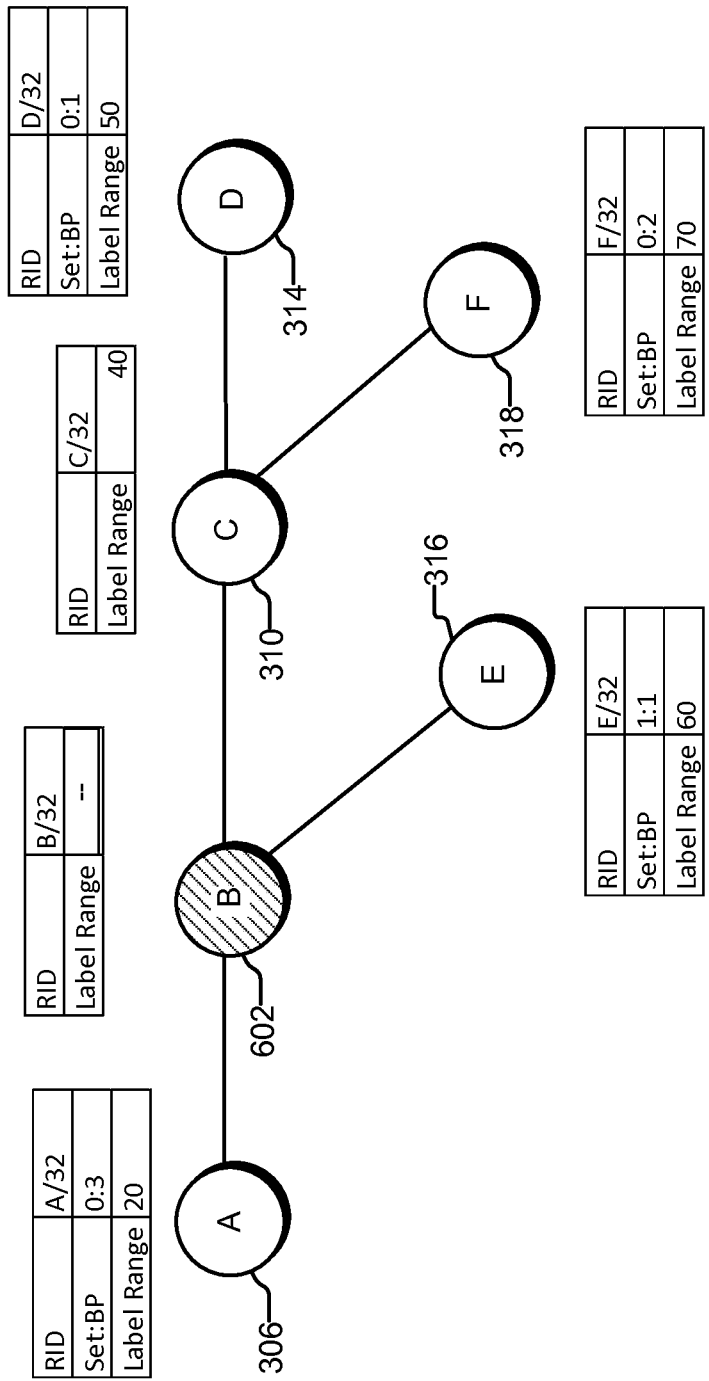
FIG. 6 is a simplified block diagram illustrating certain components of an example network.

Such a situation is illustrated by the exemplary network shown in FIG. 6. Network 600 of FIG. 6 is almost identical to network 300 of FIG. 3, except that in network 600 the node labeled B (and having a router ID of B/32) is implemented by non-BIER-enabled node 602 (the lack of BIER capability is indicated by cross-hatching of the representation of the node in FIG. 6). In the embodiment of FIG. 6, the router ID of B/32 for node 602 is the same type of ID used by non-BIER-enabled nodes in network 600, and would therefore be advertised by node 602 as part of the normal configuration and updating process employed by a network using an IGP. In the MPLS network embodiment of FIG. 6, node 602 will also advertise MPLS labels, but it will not advertise a label range such as the range beginning with label 30 shown in FIG. 3, because the label ranges of FIG. 3 are allocated as BIER labels. Use of a label within the ranges of FIG. 3 is one way to alert a BIER-enabled node that the packet carrying the label is a BIER multicast packet. In an embodiment, specific labels corresponding to particular label switched paths (LSPs) and particular network interfaces of node 602 will be advertised. The labels advertised by node 602 will be from a range not allocated to BIER; in an embodiment, the labels are exchanged with neighboring nodes using label distribution protocol (LDP). As such, nodes of network 600 not directly connected to node 602 may not receive any information regarding labels for node 602.

As a non-BIER-enabled node, node 602 stores typical unicast routing and forwarding tables but does not store a bit-indexed routing table for multicast such as table 420 in FIG. 4B or a bit-indexed forwarding table such as table 560 in FIG. 5B. Moreover, the entries related to neighbor B in the BIRTs and BIFTs of the BIER-enabled nodes within network 600 reflect that neighbor B is not BIER enabled. FIG. 7A shows an exemplary bit-indexed routing table 700 for BIER-enabled node 306 of network 600 in FIG. 6. Table 700 is similar to table 400 of FIG. 4A, except in the case of entry 702 for the router with router ID B/32. In an embodiment, the advertisements sent by the BIER-enabled nodes of network 600 are sent using opaque link-state advertisements (LSAs). In such an embodiment, a non-BIER-enabled node such as node 602 will forward BIER-related LSAs that it receives on to other nodes, even though the non-enabled node can't itself understand these LSAs. Flooding of the BIER-related LSAs by all network nodes allows a BIER-enabled node such as node 306 to form a bit-indexed routing table lacking only entry information for the non-BIER-enabled nodes. As noted in the discussion of FIG. 6 above, non-BIER-enabled node 602 does not advertise a BIER-related label range; the label range is therefore missing from entry 702.

Similar information is missing from the exemplary bit-indexed forwarding table shown in FIG. 7B for node 306 of network 600. Because paths to the egress routers can be determined through use of unicast routing tables, node 306 can determine which egress routers are reachable from neighbor B even though that node is not BIER-enabled. But because no BIER-specific label range is advertised by node 602, the remote label in column 550 of table 710 will need to be a non-BIER-related label, such as a standard unicast label. The unicast label needed depends on the particular LSP used to forward a packet to node B—i.e., how far the packet is being sent. Some specific approaches to forwarding of a BIER packet through a non-BIER-enabled node are provided below.

Figure 8:
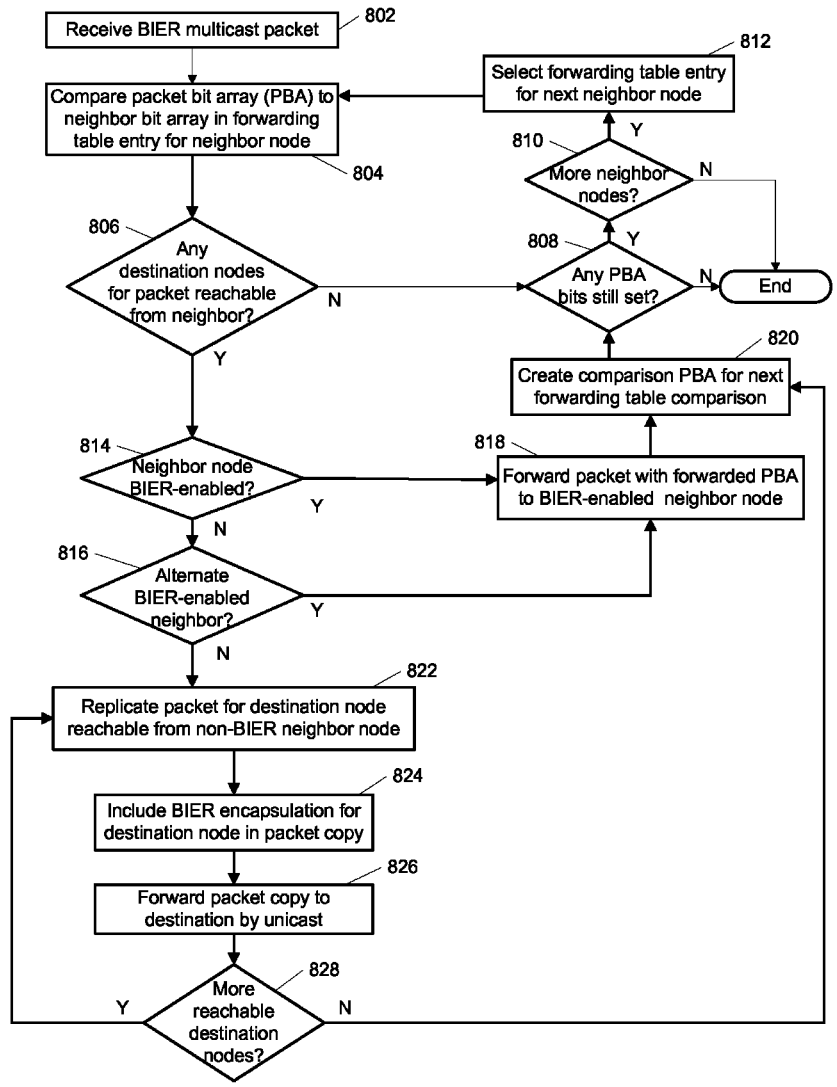
FIG. 8 is a flow chart illustrating an example process employed by a node of FIG. 6.

One embodiment of a method for forwarding a BIER packet in a network including a non-BIER-enabled node is shown in the flowchart of FIG. 8. In an embodiment, the method of FIG. 8 is performed by a network device associated with a BIER-enabled node. The method begins with receiving a BIER multicast packet at step 802. The packet bit array within the packet is compared to a neighbor bit array in a forwarding table entry for a neighbor node (step 804). The forwarding table in step 804 is a bit-indexed forwarding table comprising an entry with a neighbor bit array, such as forwarding table 540 of FIG. 5A or forwarding table 710 of FIG. 7B. In an embodiment, the forwarding table entry also includes a bit position, such as the bit positions in column 404 of FIG. 4A or column 544 of FIG. 7B. The packet bit array is compared to the neighbor bit array to determine whether any destination nodes for the packet are also reachable nodes from the neighbor associated with the forwarding table entry (decision step 806). An egress router for the network is an example of a destination node for a packet. In an embodiment, if a bit is set in the same relative bit position in both the packet bit array and the neighbor bit array, the destination node is both a destination node for the packet and a reachable node from the neighbor.

In some embodiments, the comparison of the packet bit array and neighbor bit array to determine whether a destination node for the packet is a reachable node via the neighbor is done by considering one bit at a time of the packet bit array and neighbor bit array. In such an embodiment, the forwarding table may include an entry for each bit position corresponding to a reachable destination node, and the entries may be sorted by bit position, as shown, for example, by table 540 of FIG. 5A or table 710 of FIG. 7B. The comparison in such an embodiment may include checking one bit at a time of the packet array until a bit position with a set bit is found, then looking in a bit position column of the forwarding table for an entry with a set bit in the same bit position. Such a bit-by-bit approach may be faster in some embodiments than working through the forwarding table one neighbor at a time. Sorting the forwarding table entries by bit position may also be advantageous in helping to identify nodes having two different neighbor nodes with a shortest path to the same destination node. In such a situation, an equal cost multi-path (ECMP) can be applied to choose one of the neighbor nodes for forwarding.

If no destination node of the packet is also a reachable node via a neighbor associated with a forwarding table entry (N branch of decision 806), the method of FIG. 8 checks whether any bits in the packet bit array are still set (decision step 808). If no bits are set, there are no multicast destinations remaining for the packet, and the method ends. If there are still one or more bits set in the packet bit array, the method checks whether any additional neighbor nodes are included in the forwarding table entries (decision step 810). If there are no additional neighbor nodes represented in the table (that have not already been checked by comparison of the packet bit array and neighbor bit array), the method ends. A situation in which set bits remain in the packet bit array but no neighbor nodes for forwarding remain in the forwarding table may represent, for example, a failure cause by a change in network configuration or a mislabeled packet. If there is both a set bit remaining in the packet bit array and a neighbor node to be checked for reachable destinations, the method continues by selecting a forwarding table entry for the next neighbor node in the table (step 812), and comparison of the packet bit array to the neighbor bit array for the new forwarding table entry (step 804).

When comparison of the packet bit array and a neighbor bit array for a forwarding table entry reveals an intended destination node for the packet that is also reachable through the neighbor node associated with the forwarding table entry, it is determined whether the neighbor node is BIER-enabled (step 814). In an embodiment, IGP advertisements are used to determine whether a node is BIER-enabled. For example, an opaque LSA may be established to advertise BIER capability throughout the network. As another example, the IGP neighbor hello message may be extended to include a capability field advertising BIER capability and/or BIER mask size support. In an embodiment employing MPLS, a BIER-enabled node performing the method of FIG. 8 can check its bit-indexed routing table for the label range advertised by the neighbor node to see whether a label range allocated for BIER has been advertised by the neighbor.

If the neighbor node is BIER-enabled, a copy of the packet is forwarded to the neighbor node (step 818). In the embodiment of FIG. 8, the packet bit array of the forwarded packet is altered to form a forwarded packet bit array. In the forwarded packet bit array, any set bits in the incoming packet bit array in bit positions not corresponding to reachable destinations via the neighbor node are cleared. In other words, for any destination nodes that were indicated in the incoming PBA as intended destinations but are not reachable via the neighbor node, the forwarded PBA is altered to indicate that those destinations are not intended destinations. In step 820 of the method of FIG. 8, an alteration is also made to the version of the packet bit array used for comparison with the next forwarding table entry. To create a "comparison PBA" that is compared to the neighbor bit array in the next forwarding table entry, set bits in the current packet bit array in bit positions corresponding to those reachable by the just-forwarded packet are cleared in the comparison packet bit array. The comparison packet bit array is then used as the packet bit array in subsequent steps of the method. If there are still bits set in the comparison PBA (step 808), and if there are more neighbor nodes in the forwarding table (step 810), the method continues with the comparison packet bit array used for the next comparison to a neighbor bit array. The packet bit array alterations of steps 818 and 820 are optionally employed to prevent looping and duplication of packets. These alterations may be omitted in embodiments for which duplication and looping are not present or are otherwise not of concern.

The above-described steps of the method of FIG. 8 represent an embodiment of a BIER multicast forwarding method when the forwarding node and the node forwarded to are both BIER-enabled. In a practical network, a BIER-enabled node may have some BIER-enabled neighbors to which replicated packets may be forwarded in the manner described above. Other neighbors of the BIER-enabled node may be non-BIER-enabled, however, and one embodiment of a method for forwarding to these nodes starts with the "N" branch of decision step 814.

In the embodiment of FIG. 8, if it determined that a neighbor node having reachable destination nodes is not BIER-enabled, there is first a determination whether there is an alternate BIER-enabled neighbor (step 816). In other words, is there another, BIER-enabled neighbor node that one or more of the same destination nodes is reachable from? If so, the alternate neighbor is used instead in the embodiment of FIG. 8, and the BIER forwarding process described above is carried out. In another embodiment, algorithms for selecting ECMP paths are configured to favor paths with BIER-enabled nodes if possible. In a further embodiment, such algorithms are configured to favor paths with BIER-enabled nodes if the number of packets being replicated is large enough that a significant traffic benefit is realized by using a BIER-enabled path.

If the neighbor node is not BIER-enabled and there is no alternate BIER-enabled neighbor ("N" branches of decision steps 814 and 816), the multicast packet is replicated to provide a separate copy of the packet for each of the destination nodes reachable via the non-BIER-enabled neighbor node (step 822). For each destination node, the respective packet copy includes BIER encapsulation for that destination node (step 824), and the packet copy is forwarded to the destination node by unicast forwarding (step 826). In an embodiment, the BIER encapsulation for the destination node includes a packet bit array having the bit in the bit position corresponding to the destination node set. In a further embodiment having an MPLS implementation, the BIER encapsulation includes a BIER-specific MPLS label assigned to the destination node that is inserted into the packet below a unicast MPLS label assigned to the non-BIER-enabled neighbor node. A "tunnel" to the BIER-enabled destination node is thereby created. In other embodiments a tunnel to a BIER-enabled node is created using a different tunneling mechanism, such as IPv6 Generic Routing Encapsulation (GRE) tunneling. When a packet has been forwarded for each destination node reachable via the non-BIER-enabled neighbor ("N" branch of decision step 828), the method returns to step 820 where the packet bit array is modified to unset bits corresponding to destination nodes that packets have been forwarded to. From there, if there are set bits remaining in the packet bit array and entries for additional neighbor nodes remaining in the bit-indexed forwarding table, the process continues with the next neighbor node.

Figure 9:
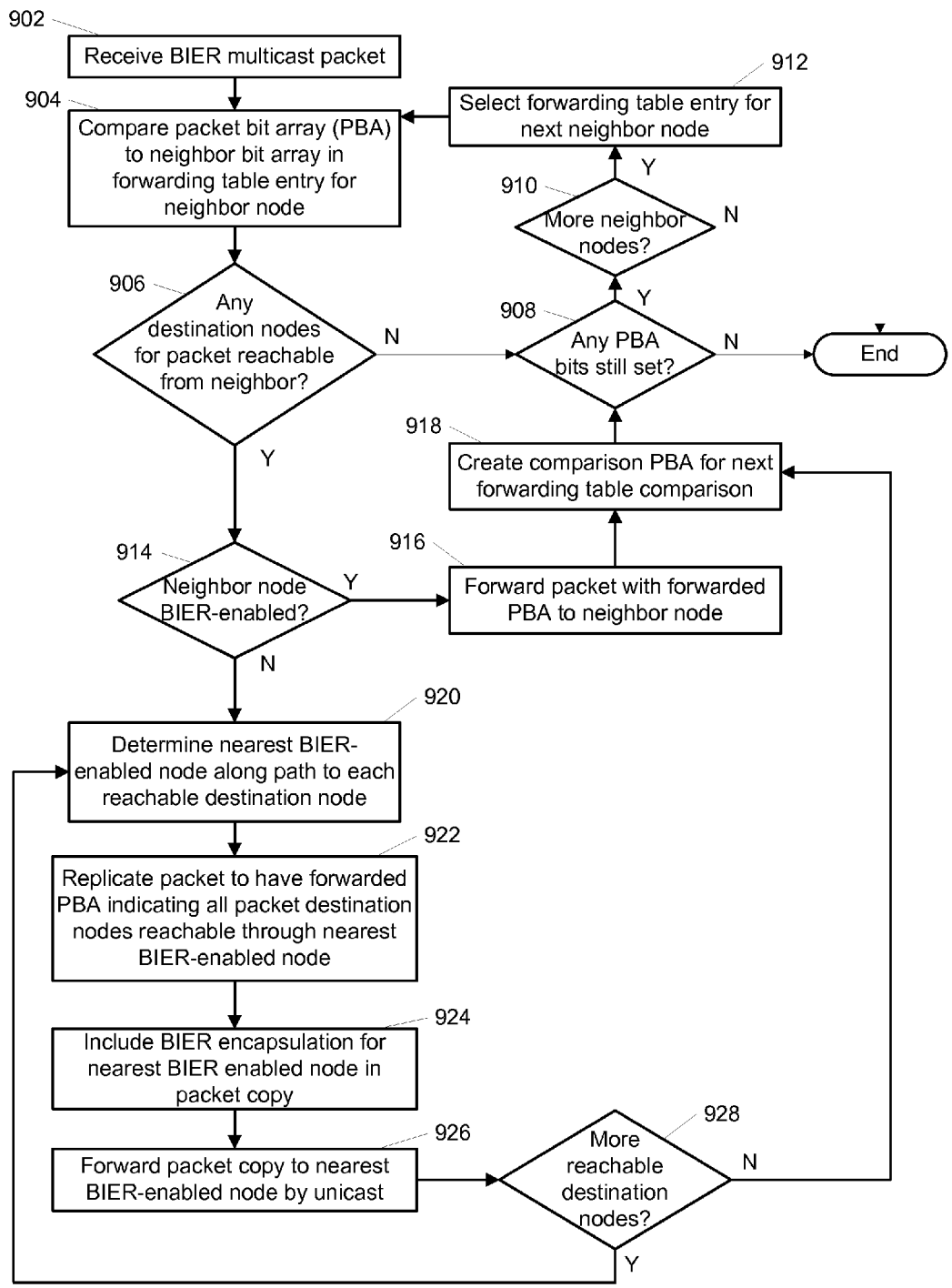
FIG. 9 is a flow chart illustrating an example process employed by a node of FIG. 6.

In the method of FIG. 8, when it is determined that a neighbor node is not BIER-enabled, the packet is replicated for each of the destination nodes reachable through the non-BIER enabled node, and the packet copies are sent to the respective destination nodes by unicast forwarding. A different approach to forwarding via a non-BIER-enabled node is shown in the method of FIG. 9. Steps 902 through 918 of FIG. 9 are similar to steps 802 through 820 of FIG. 8 in implementing forwarding using a BIER-enabled neighbor node. The flowchart of FIG. 9 omits the determination of whether a BIER-enabled alternative node exists for a non-BIER-enabled neighbor node; this determination can be included in other embodiments of the method.

When one or more intended destination nodes for a BIER multicast packet are reachable via a non-BIER-enabled neighbor node ("N" branch of decision step 914), the BIER-enabled forwarding node determines the nearest BIER-enabled node along a the shortest path to each reachable destination node (step 920). In an embodiment, determination of the nearest BIER enabled node is done by performing a recursive lookup in unicast routing tables to identify the next-hop nodes between the non-BIER-enabled neighbor node and the destination nodes. The forwarding node determines whether the next-hop nodes are BIER-enabled or not, in a manner similar to that discussed above for step 814 in FIG. 8. If any of the next-hop nodes are also non-BIER-enabled, the recursive lookup process is repeated to identify further next-hop nodes along the paths to any of the destination nodes, until a BIER-enabled node is found for each destination node reachable from the non-BIER-enabled neighbor node. The multicast packet is replicated once for each of the identified nearest BIER-enabled nodes (step 922). Assuming that multiple destination nodes are reachable via each of at least some of the identified nearest BIER-enabled nodes, the method of FIG. 9 preserves some multicast routing efficiency by replicating separate packet copies only for each of the nearest BIER-enabled nodes rather than for each destination node as is done in the method of FIG. 8.

In step 922, the forwarding node further keeps track of which destination nodes are reachable via which of the identified nearest BIER-enabled nodes, and creates a forwarded packet bit array for each replicated packet having bits set at bit positions corresponding to the destination nodes reachable via the identified nearest BIER-enabled node for that packet copy. BIER encapsulation for the identified nearest BIER-enabled node is also included in the packet copy for that node (step 924), and the packet copy is forwarded to the nearest BIER-enabled node by unicast forwarding (step 926). BIER encapsulation may be provided in a manner similar to that described for step 824 in FIG. 8. In an embodiment, the use of unicast forwarding to the nearest BIER-enabled node with underlying BIER encapsulation provides a "tunnel" for the packet to the BIER-enabled node. When a packet has been forwarded for each identified nearest BIER-enabled node on a path to a destination node reachable via the non-BIER-enabled neighbor ("N" branch of decision step 928), the method returns to step 918 where the packet bit array is modified to unset bits corresponding to destination nodes that packets have been forwarded to. From there, if there are set bits remaining in the packet bit array and entries for additional neighbor nodes remaining in the bit-indexed forwarding table, the process continues with the next neighbor node.

Figures 10A, 10B:
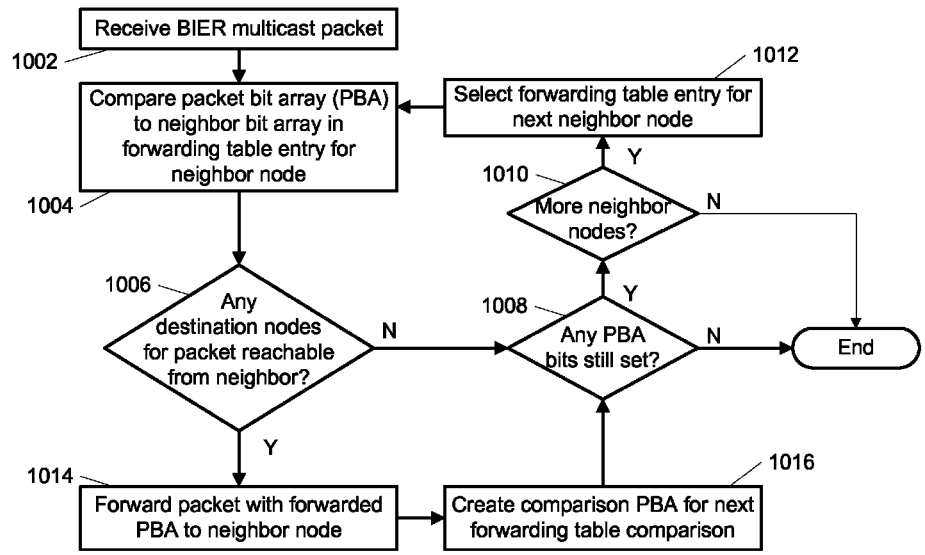
FIG. 10A is a flow chart illustrating an example process employed by a node of FIG. 6.
FIG. 10B is an exemplary routing table generated by a node of the network of FIG. 6.
Figure 10C:
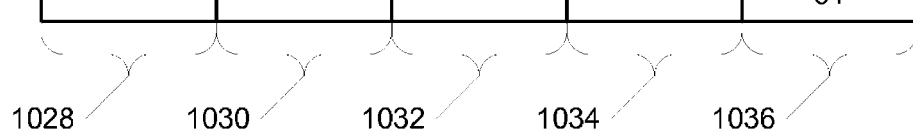
FIG. 10C is an exemplary forwarding table generated by a node of the network of FIG. 6.

An additional approach to BIER forwarding via non-BIER-enabled nodes is shown in FIGS. 10A through 10C. The flowchart of FIG. 10A has the form of a method for forwarding in a BIER-enabled network, and does not include a determination of whether the neighbor node is BIER-enabled. This is a result of incorporation of the tunneling described in the methods of FIG. 8 and FIG. 9 above into the routing and forwarding tables associated with the BIER-enabled node performing the method of FIG. 10.

An exemplary bit-indexed routing table 1018 for node 306 in network 600 of FIG. 6 is shown in FIG. 10B. Routing table 1018 includes only BIER-enabled nodes of network 600, and therefore does not include router ID B/32 for node 602. Moreover, neighbor column 1026 does not include neighbor B as the directly-connected neighbor on the path between node 306 and each network node, but instead includes the nearest BIER-enabled node between node 306 and each of the other BIER-enabled nodes in network 600. In an embodiment, the nearest BIER-enabled nodes are determined using recursive lookup in unicast routing tables, in the manner discussed above for step 920 in FIG. 9. The columns in table 1018 are otherwise similar to those of the bit-indexed routing tables of FIGS. 4A, 4B, and 7A.

Bit-indexed forwarding table 1040 of FIG. 10C is generated by node 306 using routing table 1018. Like routing table 1018 of FIG. 10B, forwarding table 1040 does not include node 602 having router ID B/32 as a neighbor, instead using BIER-enabled neighbors C and E in neighbor column 1034. Remote label column 1036 accounts for the presence of node 602, however. In addition to the BIER label 40 for neighbor C and BIER label 61 for neighbor E, forwarding table 1040 provides unicast labels for forwarding to non-BIER-enabled node 602. In the embodiment of FIG. 10C, label 330 is the unicast MPLS label assigned to node 602 for the LSP terminating at neighbor C, and label 340 is the unicast MPLS label assigned to node 602 for the LSP terminating at neighbor E. Forwarding using table 1040 pushes both labels onto a BIER multicast packet and sends the packet to node 602. Node 602, as the penultimate node in each LSP, removes the unicast label without replacing it. The packet then arrives at the nearest BIER-enabled node with the appropriate BIER-allocated label so that BIER multicast forwarding can continue. In this way static tunnels are embedded into the bit-indexed forwarding table.

Figure 11:
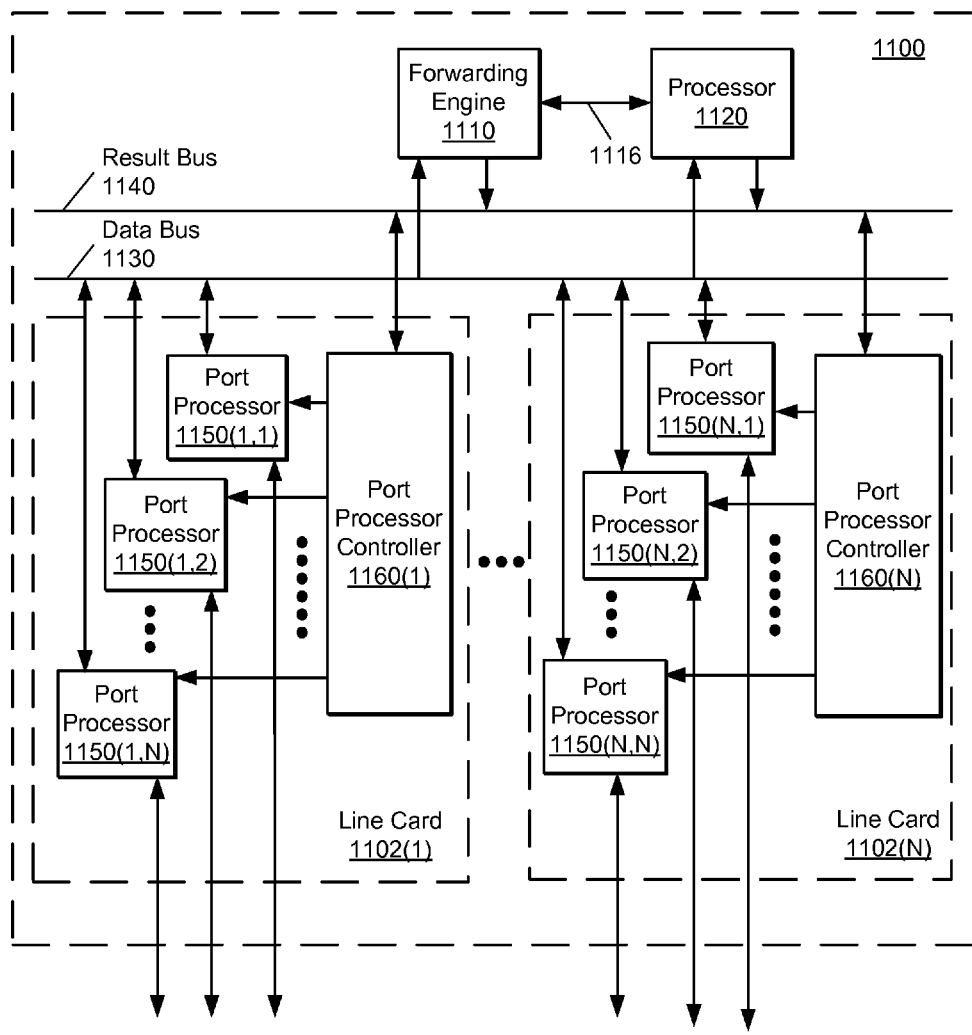
FIG. 11 is a block diagram illustrating certain components of an example network device that can be employed in the networks described herein.

FIG. 11 is a block diagram illustrating certain additional and/or alternative components of nodes that can be employed, for example in the networks shown in FIGS. 2, 3, and 6. In this depiction, node 1100 includes a number of line cards (line cards 1102(1)-(N)) that are communicatively coupled to a forwarding engine or packet forwarder 1110 and a processor 1120 via a data bus 1130 and a result bus 1140. Line cards 1102(1)-(N) include a number of port processors 1150(1,1)-(N,N) which are controlled by port processor controllers 1160(1)-(N). It will also be noted that forwarding engine 1110 and processor 1120 are not only coupled to one another via data bus 1130 and result bus 1140, but are also communicatively coupled to one another by a communications link 1116.

The processors 1150 and 1160 of each line card 1102 may be mounted on a single printed circuit board. When a packet or packet and header are received, the packet or packet and header may be identified and analyzed by router 1100 in the following manner. Upon receipt, a packet (or some or all of its control information) or packet and header is sent from the one of port processors 1150(1,1)-(N,N) at which the packet or packet and header was received to one or more of those devices coupled to data bus 1130 (e.g., others of port processors 1150(1,1)-(N,N), forwarding engine 1110 and/or processor 1120). Handling of the packet or packet and header can be determined, for example, by forwarding engine 1110. For example, forwarding engine 1110 may determine that the packet or packet and header should be forwarded to one or more of port processors 1150(1,1)-(N, N). This can be accomplished by indicating to corresponding one(s) of port processor controllers 1160(1)-(N) that the copy of the packet or packet and header held in the given one(s) of port processors 1150(1,1)-(N,N) should be forwarded to the appropriate one of port processors 1150(1,1)- (N,N). In addition, or alternatively, once a packet or packet and header has been identified for processing, forwarding engine 1110, processor 1120 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 12:
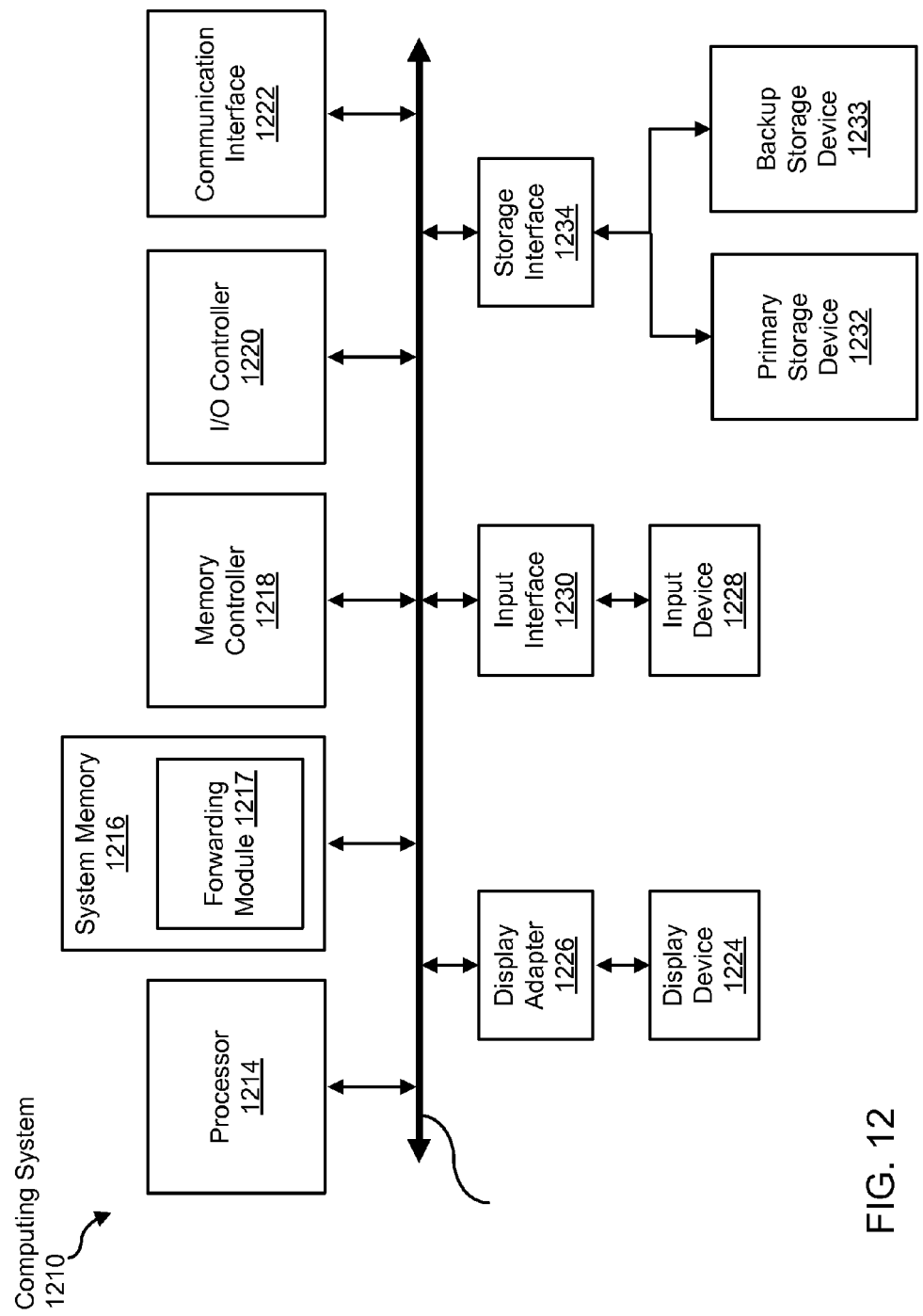
FIG. 12 is a block diagram depicting a computer system suitable for implementing embodiments of the devices and systems described herein.

FIG. 12 is a block diagram of a computing device, illustrating how a forwarding module can be implemented in software, as described above. Computing system 1210 broadly represents any single or multi-processor computing device or system capable of executing computer-readable instructions. Examples of computing system 1210 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1210 may include at least one processor 1214 and a system memory 1216. By executing the software that implements a forwarding module 1217, computing system 1210 becomes a special purpose computing device that is configured to perform packet forwarding, in the manner described above.

Processor 1214 generally represents any type or form of processing unit capable of processing data or interpreting and executing instructions. In certain embodiments, processor 1214 may receive instructions from a software application or module. These instructions may cause processor 1214 to perform the functions of one or more of the embodiments described and/or illustrated herein. For example, processor 1214 may perform and/or be a means for performing the operations described herein. Processor 1214 may also perform and/or be a means for performing any other operations, methods, or processes described and/or illustrated herein.

System memory 1216 generally represents any type or form of volatile or non-volatile storage device or medium capable of storing data and/or other computer-readable instructions. Examples of system memory 1216 include, without limitation, random access memory (RAM), read only memory (ROM), flash memory, or any other suitable memory device. Although not required, in certain embodiments computing system 1210 may include both a volatile memory unit (such as, for example, system memory 1216) and a non-volatile storage device (such as, for example, primary storage device 1232, as described in detail below). In one example, program instructions executable to implement a forwarding module configured to forward multicast data packets may be loaded into system memory 1216.

In certain embodiments, computing system 1210 may also include one or more components or elements in addition to processor 1214 and system memory 1216. For example, as illustrated in FIG. 12, computing system 1210 may include a memory controller 1218, an Input/Output (I/O) controller 1220, and a communication interface 1222, each of which may be interconnected via a communication infrastructure 1212. Communication infrastructure 1214 generally represents any type or form of infrastructure capable of facilitating communication between one or more components of a computing device. Examples of communication infrastructure 1214 include, without limitation, a communication bus (such as an Industry Standard Architecture (ISA), Peripheral Component Interconnect (PCI), PCI express (PCIe), or similar bus) and a network.

Memory controller 1218 generally represents any type or form of device capable of handling memory or data or controlling communication between one or more components of computing system 1210. For example, in certain embodiments memory controller 1218 may control communication between processor 1214, system memory 1216, and I/O controller 1220 via communication infrastructure 1214. In certain embodiments, memory controller 1218 may perform and/or be a means for performing, either alone or in combination with other elements, one or more of the operations or features described and/or illustrated herein.

I/O controller 1220 generally represents any type or form of module capable of coordinating and/or controlling the input and output functions of a computing device. For example, in certain embodiments I/O controller 1220 may control or facilitate transfer of data between one or more elements of computing system 1210, such as processor 1214, system memory 1216, communication interface 1222, display adapter 1226, input interface 1230, and storage interface 1234.

Communication interface 1222 broadly represents any type or form of communication device or adapter capable of facilitating communication between computing system 1210 and one or more additional devices. For example, in certain embodiments communication interface 1222 may facilitate communication between computing system 1210 and a private or public network including additional computing systems. Examples of communication interface 1222 include, without limitation, a wired network interface (such as a network interface card), a wireless network interface (such as a wireless network interface card), a modem, and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1222 may also represent a host adapter configured to facilitate communication between computing system 1210 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1222 may also allow computing system 1210 to engage in distributed or remote computing. For example, communication interface 1222 may receive instructions from a remote device or send instructions to a remote device for execution.

As illustrated in FIG. 12, computing system 1210 may also include at least one display device 1224 coupled to communication infrastructure 1214 via a display adapter 1226. Display device 1224 generally represents any type or form of device capable of visually displaying information forwarded by display adapter 1226. Similarly, display adapter 1226 generally represents any type or form of device configured to forward graphics, text, and other data from communication infrastructure 1214 (or from a frame buffer) for display on display device 1224.

As illustrated in FIG. 12, computing system 1210 may also include at least one input device 1228 coupled to communication infrastructure 1214 via an input interface 1230. Input device 1228 generally represents any type or form of input device capable of providing input, either computer or human generated, to computing system 1210. Examples of input device 1228 include, without limitation, a keyboard, a pointing device, a speech recognition device, or any other input device.

As illustrated in FIG. 12, computing system 1210 may also include a primary storage device 1232 and a backup storage device 1233 coupled to communication infrastructure 1214 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a floppy disk drive, a magnetic tape drive, an optical disk drive, a flash drive, or the like. Storage interface 1234 generally represents any type or form of interface or device for transferring data between storage devices 1232 and 1233 and other components of computing system 1210. A storage device like primary storage device 1232 can store information such as routing tables and forwarding tables.

In certain embodiments, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also include other similar structures or devices for allowing computer software, data, or other computer-readable instructions to be loaded into computing system 1210. For example, storage devices 1232 and 1233 may be configured to read and write software, data, or other computer-readable information. Storage devices 1232 and 1233 may also be a part of computing system 1210 or may be a separate device accessed through other interface systems.

Many other devices or subsystems may be connected to computing system 1210. Conversely, all of the components and devices illustrated in FIG. 12 need not be present to practice the embodiments described and/or illustrated herein. The devices and subsystems referenced above may also be interconnected in different ways from that shown in FIG. 12.

Computing system 1210 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1210 for storage in memory via a network such as the Internet or upon a carrier medium.

The computer-readable medium containing the computer program may be loaded into computing system 1210. All or a portion of the computer program stored on the computer-readable medium may then be stored in system memory 1216 and/or various portions of storage devices 1232 and 1233. When executed by processor 1214, a computer program loaded into computing system 1210 may cause processor 1214 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1210 may be configured as an application specific integrated circuit (ASIC) adapted to implement one or more of the embodiments disclosed herein.

Although the present disclosure includes several embodiments, the disclosure is not intended to be limited to the specific forms set forth herein. On the contrary, it is intended to cover such alternatives, modifications, and equivalents as can be reasonably included within the scope defined by the appended claims.

What is claimed is:

1. A method comprising:
   receiving at a node in a network a multicast message comprising an incoming message bit array, wherein
   the node is configured to store and use a bit-indexed forwarding table comprising multiple forwarding table entries,
   each of the multiple forwarding table entries comprises a respective neighbor bit array and is associated with a respective neighboring node, and
   a set of multiple possible destination nodes for the message corresponds to the same set of respective relative bit positions in the incoming message bit array and each of the neighbor bit arrays;
   comparing the incoming message bit array to a first neighbor bit array associated with a first forwarding table entry of the multiple forwarding table entries;
   determining that for at least one relative bit position the corresponding destination node is both an intended destination for the message and a reachable destination from a first neighboring node associated with the first forwarding table entry; and
   in response to a determination that an intended destination for the message is a reachable destination from the first neighboring node, forwarding toward the first neighboring node a copy of the message comprising a forwarded message bit array, wherein a first node along the path of the forwarded message is not configured to use a respective bit-indexed forwarding table.

2. The method of claim 1, wherein:
   a bit value of a bit position in the message bit array indicates whether the corresponding destination node is an intended destination for the message; and
   a bit value of a bit position in each neighbor bit array indicates whether the corresponding destination node is reachable from the respective neighboring node associated with the forwarding table entry.

3. The method of claim 1, further comprising performing a first modification to the forwarded message bit array.

4. The method of claim 3, further comprising:
   in response to the determination that an intended destination for the message is a reachable destination from the first neighboring node, performing a second modification to the incoming message bit array to form a comparison message bit array, wherein the comparison message bit array is configured to be compared to a second neighbor bit array associated with a second forwarding table entry of the multiple forwarding table entries.

5. The method of claim 3, wherein said performing a first modification comprises:
   for any destination node that is indicated by the incoming message bit array as an intended destination but indicated by the first neighbor bit array as an unreachable destination, altering the bit value of the corresponding relative bit position in the forwarded message bit array from that of the incoming message bit array to indicate that the destination node is not an intended destination.

6. The method of claim 4, wherein said performing a second modification comprises:
   for any destination node indicated by the incoming message bit array as an intended destination and indicated by the first neighbor bit array as a reachable destination, altering the bit value of the corresponding relative bit position in the comparison message bit array from that of the incoming message bit array to indicate that the destination node is not an intended destination.

7. The method of claim 1, wherein
the multicast message further comprises a set identifier having multiple possible values;
each possible value of the set identifier corresponds to a different set of multiple possible destination nodes for the message; and
a combination of a set identifier value and a relative bit position in the incoming message bit array uniquely identifies a possible destination node for the message.

8. The method of claim 1, wherein said comparing comprises:
identifying a relative bit position in the incoming message bit array corresponding to an intended destination; and
identifying an entry in the bit-indexed forwarding table for which the identified relative bit position corresponds to a reachable destination.

9. The method of claim 1, wherein the multicast message comprises a multicast packet.

10. The method of claim 1, wherein:
the first node along the path of the forwarded message is the first neighboring node; and
said forwarding comprises sending a separate copy of the message to each of the destination nodes determined to be both an intended destination for the message and a reachable destination from the first neighboring node.

11. The method of claim 10, wherein said forwarding further comprises accessing a unicast forwarding table entry associated with each destination node that a copy of the message is forwarded to.

12. The method of claim 11, wherein said forwarding further comprises including within each forwarded message an identifier configured to alert the respective destination node to access the respective forwarded message bit array.

13. The method of claim 1, wherein the first node on the path of the forwarded message is the first neighboring node, and said forwarding comprises:
identifying, for each of the destination nodes determined to be both an intended destination for the message and a reachable destination from the first neighboring node, a nearest node, along a path to the respective destination node, that comprises a respective bit-indexed forwarding table; and
sending a separate copy of the message to each of the identified nodes.

14. The method of claim 13, wherein said sending comprises modifying the respective forwarded message bit array in each copy of the message to indicate as intended destination nodes only those destination nodes indicated as intended by the incoming message bit array and also reachable from the respective identified node that the copy of the message is sent to.

15. The method of claim 13, wherein said sending comprises including within each forwarded message:
a first identifier configured to be used by the first node on the path of the respective forwarded message in conveying the message to the identified node along the path to a destination node for the message; and
a second identifier configured to alert the identified node to access the forwarded message bit array within the message.

16. The method of claim 1, wherein:
the first neighboring node comprises a respective bit-indexed forwarding table; and
the first forwarding table entry comprises
a first identifier configured to be included within the forwarded message and to be used by the first node on the path of the forwarded message in conveying the message to the first neighboring node, and
a second identifier configured to be included within the forwarded message and to alert the first neighboring node to access the forwarded message bit array.

17. A network device associated with a network node, the network device comprising:
one or more network interfaces;
a memory configured to store a bit-indexed forwarding table comprising multiple forwarding table entries, wherein each of the multiple forwarding table entries comprises a respective neighbor bit array and is associated with a respective neighboring node; and
a processor configured to
receive at the network node a multicast message comprising an incoming message bit array, wherein
a set of multiple possible destination nodes for the message corresponds to the same set of respective relative bit positions in the incoming message bit array and each of the neighbor bit arrays,
compare the incoming message bit array to a first neighbor bit array associated with a first forwarding table entry of the multiple forwarding table entries,
determine that for at least one relative bit position the corresponding destination node is both an intended destination for the message and a reachable destination from a first neighboring node associated with the first forwarding table entry, and
in response to a determination that an intended destination for the message is a reachable destination from the first neighboring node, forward toward the first neighboring node a copy of the message comprising a forwarded message bit array, wherein a first node on the path of the forwarded message does not comprise a respective bit-indexed forwarding table.

18. The network device of claim 17, wherein:
the first node on the path of the forwarded message is the first neighboring node; and
the processor is further configured to send a separate copy of the message to each of the destination nodes determined to be both an intended destination for the message and a reachable destination from the first neighboring node.

19. The network device of claim 17, wherein:
the first node on the path of the forwarded message is the first neighboring node; and
the processor is further configured to
identify, for each of the destination nodes determined to be both an intended destination for the message and a reachable destination from the first neighboring node, a nearest node, along a path to the respective destination node, that comprises a respective bit-indexed forwarding table, and
send a separate copy of the message to each of the identified nodes.

20. The network device of claim 17, wherein:
the first neighboring node comprises a respective bit-indexed forwarding table; and
the first forwarding table entry comprises
a first identifier configured to be included within the forwarded message and to be used by the first node on the path of the forwarded message in conveying the message to the first neighboring node, and a second identifier configured to be included within the forwarded message and to alert the first neighboring node to access the forwarded message bit array.

21. The network device of claim 20, wherein:

the memory is further configured to store a bit-indexed routing table; and the routing table comprises entries only for nodes configured to use respective bit-indexed forwarding tables.

* * * * *